(12) United States Patent
Swilley

(10) Patent No.: US 11,518,052 B2
(45) Date of Patent: Dec. 6, 2022

(54) HAND-HELD MULTI-PURPOSE KITCHEN TOOL

(71) Applicant: Michael Swilley, Menlo, GA (US)

(72) Inventor: Michael Swilley, Menlo, GA (US)

(*) Notice: Subject to any disclaimer, the term of this patent is extended or adjusted under 35 U.S.C. 154(b) by 0 days.

(21) Appl. No.: 16/868,562

(22) Filed: May 7, 2020

(65) Prior Publication Data

US 2021/0347066 A1 Nov. 11, 2021

(51) Int. Cl.
| | |
|---|---|
| A47J 43/18 | (2006.01) |
| B26B 29/02 | (2006.01) |
| A47J 43/28 | (2006.01) |
| A23L 5/00 | (2016.01) |
| A23L 35/00 | (2016.01) |
| B26B 11/00 | (2006.01) |
| A47J 19/00 | (2006.01) |

(52) U.S. Cl.
CPC ............ B26B 11/00 (2013.01); A23L 5/00 (2016.08); A23L 35/00 (2016.08); A47J 19/005 (2013.01); A47J 43/18 (2013.01); A47J 43/28 (2013.01); B26B 29/02 (2013.01); *A23V 2300/31* (2013.01); *A23V 2300/38* (2013.01); *A23V 2300/41* (2013.01)

(58) Field of Classification Search
CPC .................................. B26B 29/02; A47J 43/25
See application file for complete search history.

(56) References Cited

U.S. PATENT DOCUMENTS

| | | | | |
|---|---|---|---|---|
| 6,315,224 B1* | 11/2001 | Holcomb | ............... | A47J 43/25 |
| | | | | 241/273.2 |
| 2005/0138736 A1* | 6/2005 | Tarlow | ................. | A47J 43/282 |
| | | | | 7/110 |
| 2008/0028951 A1* | 2/2008 | Esterman | ............... | A47J 19/04 |
| | | | | 99/537 |
| 2014/0209720 A1* | 7/2014 | Juarez | .................... | A47J 43/25 |
| | | | | 241/29 |
| 2018/0154532 A1* | 6/2018 | Myvett | .................. | A47J 43/25 |

OTHER PUBLICATIONS

"Hulless Stainless steel Onion Holder for Slicing, Vegetable Potato Cutter Slicer, Onion cutting tool, Stainless steel Cutting Kitchen gadgets" First available Jul. 26, 2017. (Year: 2017).*

(Continued)

*Primary Examiner* — Katherine D Leblanc
(74) *Attorney, Agent, or Firm* — Charlena Thorpe, Esq.; Incorporating Innovation LLC

(57) ABSTRACT

Implementations of a hand-held multi-purpose kitchen tool are provided. In some implementations, the hand-held multi-purpose kitchen tool comprises a handle for holding and using the hand-held multi-purpose kitchen tool and a body comprising a plurality of surfaces and features configured to prepare food and to protect a user's hand while preparing food.

In some implementations, a method for using the hand-held multi-purpose kitchen tool comprises holding the hand-held multi-purpose kitchen tool with the handle and using one or more of the surfaces and features of the hand-held multi-purpose kitchen tool to prepare food and/or to protect the user's hand while preparing the food.

2 Claims, 12 Drawing Sheets

(56) References Cited

OTHER PUBLICATIONS https://www.amazon.com/Hulless-Stainless-Slicing-Vegetable-gadgets/dp/B0749GS5NQ/ref=asc_df_B0749GS5NQ/?tag=hyprod-20&linkCode=df0&hvadid=216557069174&hvpos=&hvnetw=g&hvrand=6874269750816514456&hvpone=&hvptwo=&hvqmt=&hvdev=c&hvdvcmdl=&hvlocint=&hvlocphy=9001772&hvtargid=pla-362496719245&psc=1 (Year: 2017).*

"Kids in the kitchen: French knife makes creates serious, safe cooking tools for young chefs". Mar. 30, 2014 https://blue-kitchen.com/2014/03/30/serious-cooking-tools-for-young-chefs/ (Year: 2014).*

Claudepierre, Carine "How to Squeeze the most Juice from a Lime without a Juicer" May 24, 2014. https://www.sweetashoney.co/how-to-squeeze-the-most-juice-from-a-lime-without-a-juicer/ (Year: 2014).*

* cited by examiner

HAND-HELD MULTI-PURPOSE KITCHEN TOOL

TECHNICAL FIELD

This disclosure relates to implementations of a hand-held multi-purpose kitchen tool.

BACKGROUND

As shown in FIG. 1, typically, to protect a person's hands while cutting food, the person will curl his/her fingers inward to protect the fingertips from a sharp knife. However, the fingers are still exposed and can be cut by the knife. Furthermore, there does not exist a tool designed to protect a person fingertips while he/she is cutting food and to provide additional food preparation functionality.

DETAILED DESCRIPTION

Figure 1:
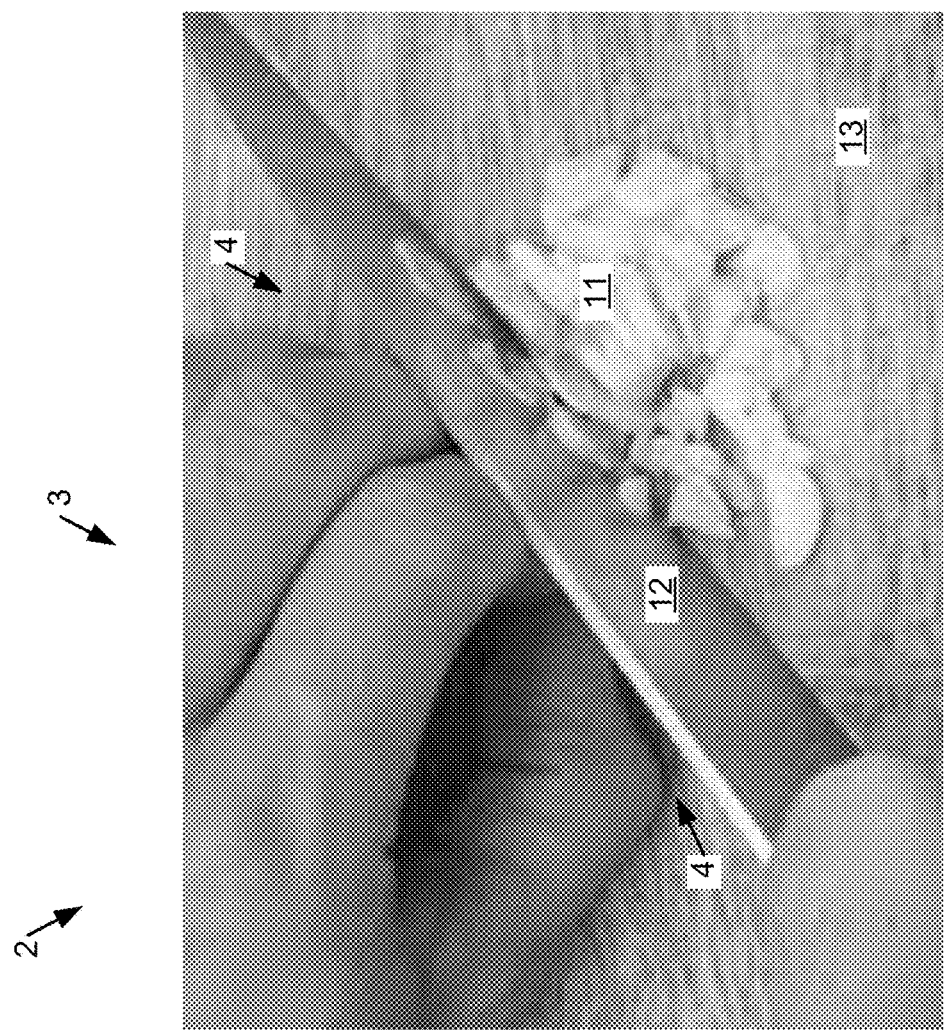
FIG. 1 illustrates an example existing way of protecting a person's hand while cutting food.

Implementations of a hand-held multi-purpose kitchen tool are provided. In some implementations, the hand-held multi-purpose kitchen tool comprises a handle for holding and using the hand-held multi-purpose kitchen tool and a body comprising a plurality of surfaces and features configured to prepare food and to protect a user's hand while preparing food.

In some implementations, the hand-held multi-purpose kitchen tool is configured to protect a user's fingertips while cutting food, such as food positioned on a cutting board, countertop, or other surface.

In some implementations, the hand-held multi-purpose kitchen tool is configured to protect a user's fingertips while using the hand-held multi-purpose kitchen tool for any other suitable food preparation (or processing, etc.) function.

In some implementations, the hand-held multi-purpose kitchen tool is configured to additionally or alternately protect other portions of a user's hand, such as the user's fingers, fingernails, knuckles, etc.

In some implementations, the hand-held multi-purpose kitchen tool is configured to protect a user's fingertips, and/or other portions of a user's hand, from pain or injury while using the hand-held multi-purpose kitchen tool to prepare food, such as from being cut, scratched, or otherwise hurt or injured.

In some implementations, the hand-held multi-purpose kitchen tool is configured to protect a user's fingertips, and/or other portions of a user's hand, from exposure while using the hand-held multi-purpose kitchen tool to prepare food, such as from contacting and absorbing the smell of the food or feeling a stinging sensation caused by contact with the food.

In such ways, in some implementations, the hand-held multi-purpose kitchen tool serves as a shield, guard, and/or barrier for a user's fingertips, and/or other portions of a user's hand, while using the hand-held multi-purpose kitchen tool to cut or otherwise prepare food.

In some implementations, the hand-held multi-purpose kitchen tool is configured to be held by the handle and used to prepare food, such as cutting the food.

In some implementations, the hand-held multi-purpose kitchen tool is configured to be held by the handle and used to protect a user's fingertips, and/or other portions of a user's hand, while preparing food.

In some implementations, the hand-held multi-purpose kitchen tool is configured to press, crush, or otherwise compress food, such as garlic, on a surface, such as a cutting board or countertop.

In some implementations, the hand-held multi-purpose kitchen tool is configured to rake or scrape food across a surface, such as a cutting board or countertop, or to rake or scrape food along or off of a surface, such as a knife blade.

In some implementations, the hand-held multi-purpose kitchen tool is configured to hold down food, such as carrots or celery, on a surface, such as a cutting board or countertop, for cutting or other preparation of the food.

In some implementations, the hand-held multi-purpose kitchen tool is configured to pin down or otherwise hold in place food, such as meat, on a surface, such as a cutting board or countertop, for cutting or other preparation of the food.

In some implementations, the hand-held multi-purpose kitchen tool is configured to pull apart and/or shred off food, such as meat, on a surface, such as a cutting board or countertop, for cutting or other preparation of the food.

In some implementations, the hand-held multi-purpose kitchen tool is configured to cup or juice food, such as a lemon or a lime, positioned on a surface, such as a cutting board or countertop, or held in a user's hand, to extract or otherwise obtain the juice, liquid, or similar content from the food.

In some implementations, the hand-held multi-purpose kitchen tool is configured to slice or cut food, such as cheese, positioned on a surface, such as a cutting board or countertop, or held in a user's hand.

In some implementations, the hand-held multi-purpose kitchen tool is configured to shave or peel food, such as fruit or vegetables, positioned on a surface, such as a cutting board or countertop, or held in a user's hand.

In some implementations, the hand-held multi-purpose kitchen tool is configured to zest food, such as a lemon or lime, positioned on a surface, such as a cutting board or countertop, or held in a user's hand.

In some implementations, the hand-held multi-purpose kitchen tool is configured to grate and/or shred food, such as cheese, positioned on a surface, such as a cutting board or countertop, or held in a user's hand.

In some implementations, the hand-held multi-purpose kitchen tool is configured to use while cutting food in any suitable way, such as slicing, dicing, or mincing the food.

In some implementations, the hand-held multi-purpose kitchen tool is configured to hold, grip, and/or contain food while cutting the food.

In some implementations, the hand-held multi-purpose kitchen tool is configured to provide any other suitable food preparation function.

In some implementations, the hand-held multi-purpose kitchen tool is configured to use to prepare any suitable foods, such as vegetables, fruits, herbs, meats, etc.

In some implementations, a method for using the hand-held multi-purpose kitchen tool comprises holding the hand-held multi-purpose kitchen tool with the handle and using one or more of the surfaces and features of the hand-held multi-purpose kitchen tool to prepare food and/or to protect the user's hand while preparing the food.

As shown in FIG. 1, typically, to protect a person's hands 2 while cutting food 11, the person will curl his/her fingers 3 inward to protect the fingertips 4 from a knife 12 (e.g., a large and/or sharp kitchen knife). For example, this or a similar way may be used in an attempt to protect the person's hands 2 while cutting food 11 that is positioned on a surface 13, such as a cutting board or countertop, or held in the person's hand 2. However, the person's fingers 3, fingertips 4, and/or other portions of the hands 2 are still exposed and can be cut by the knife 12.

Figure 2:
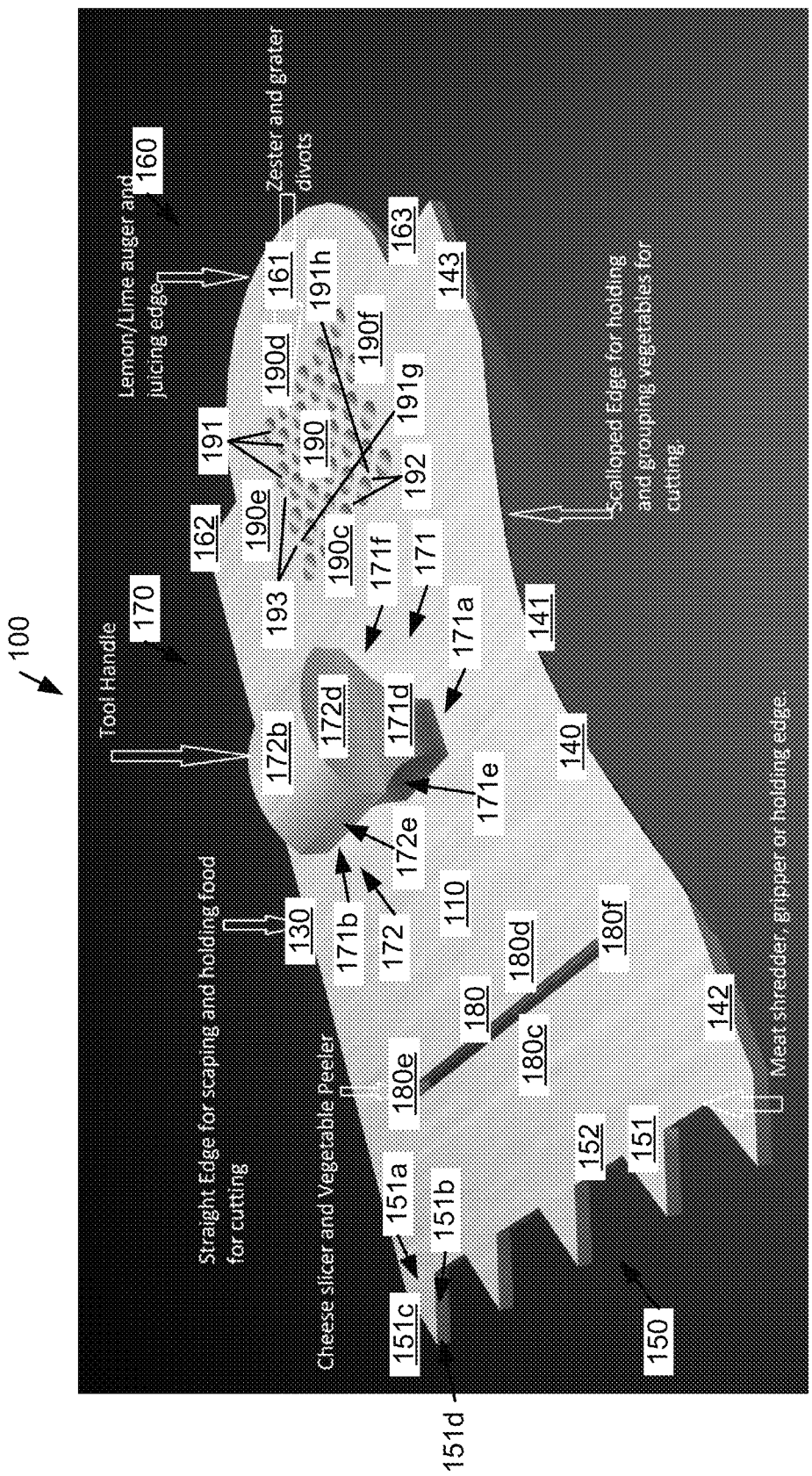
FIGS. 2-4 illustrate an implementation of an example hand-held multi-purpose kitchen tool according to the present disclosure.
Figure 3:
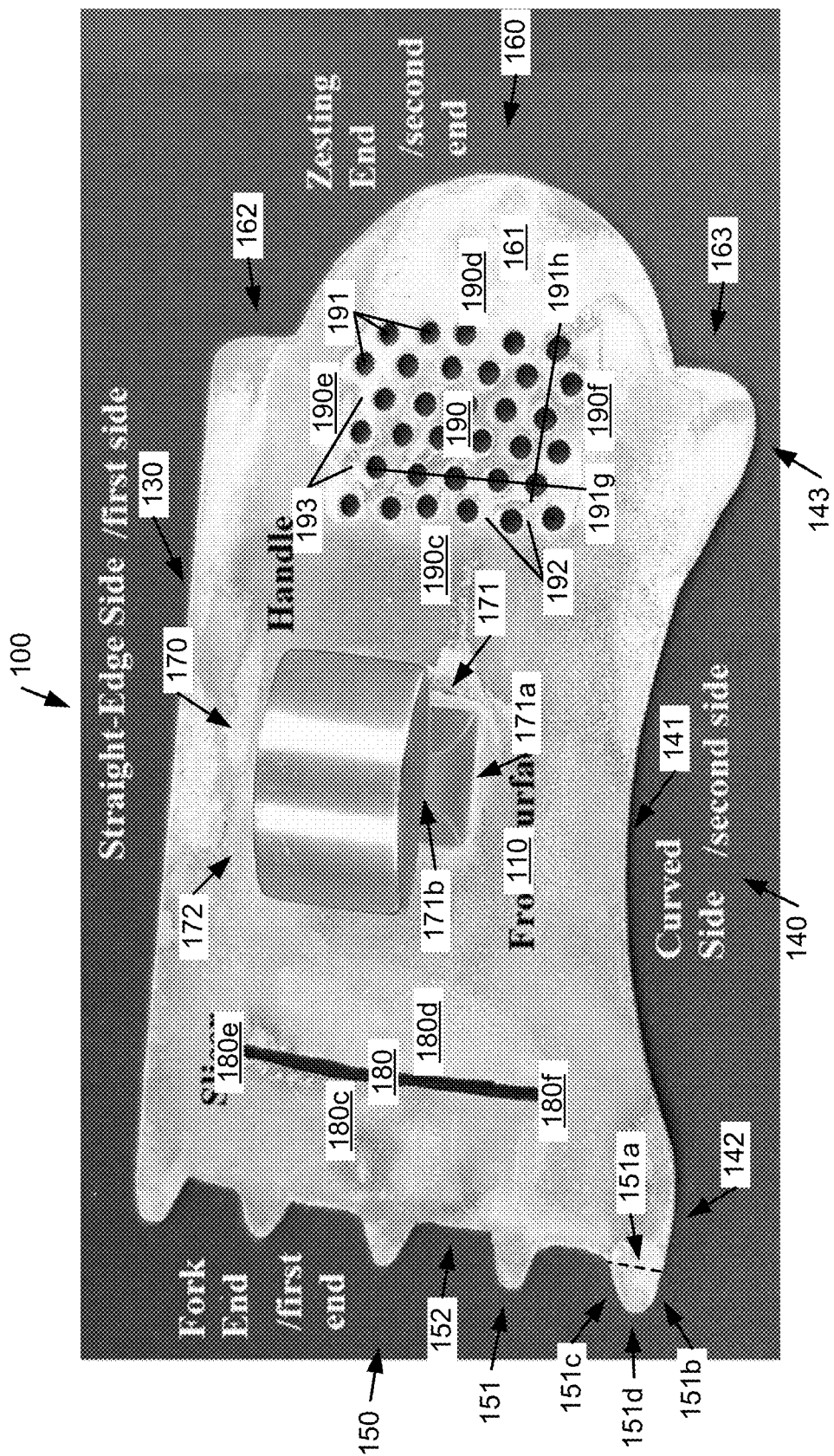
Figure 4:
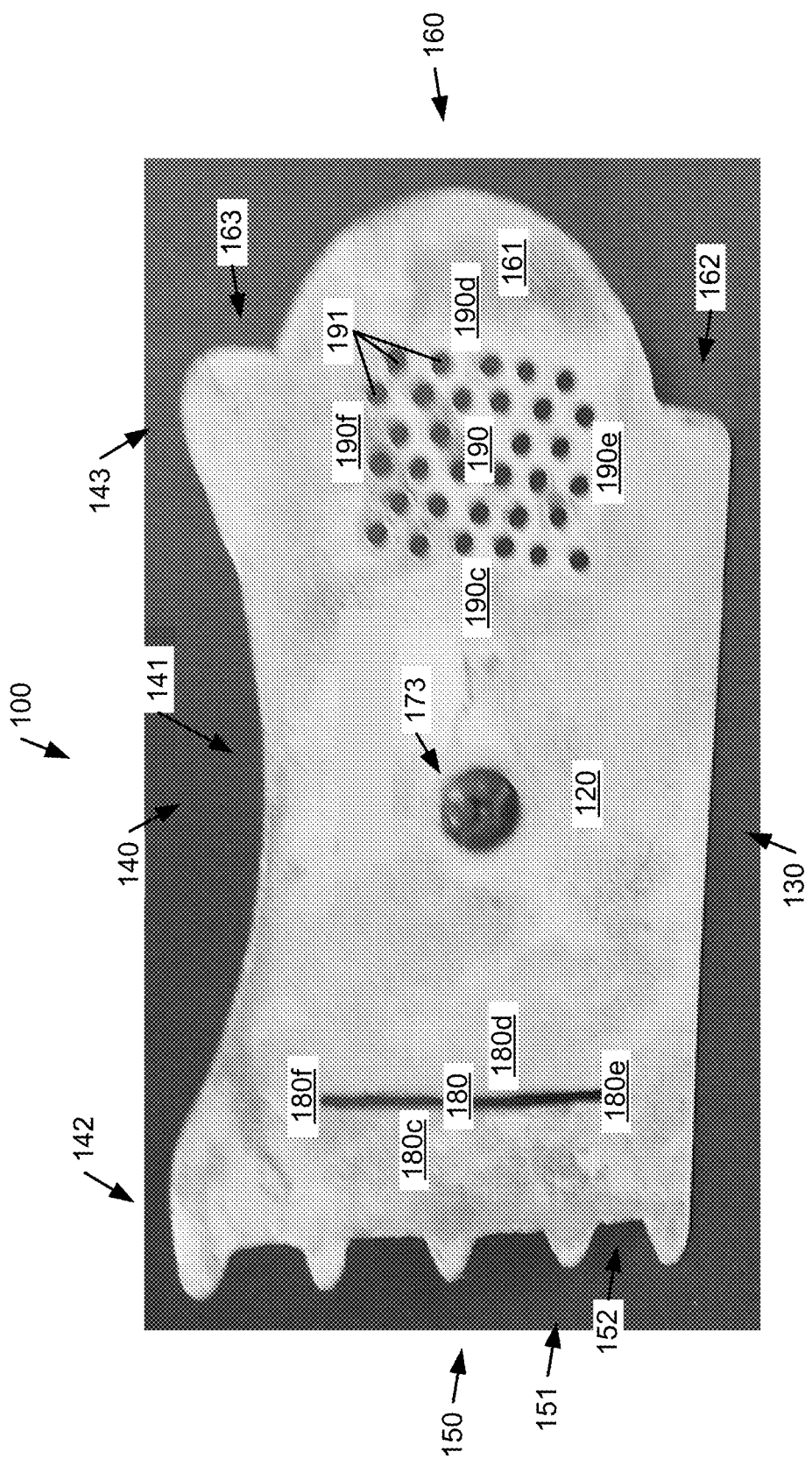

FIGS. 2-4 illustrate an implementation of an example hand-held multi-purpose kitchen tool 100 according to the present disclosure. FIG. 2 illustrates a perspective view of the hand-held multi-purpose kitchen tool 100. FIG. 3 illustrates a front or top view of the hand-held multi-purpose kitchen tool 100. FIG. 4 illustrates a back or bottom view of the hand-held multi-purpose kitchen tool 100.

As shown in FIG. 3, in some implementations, the hand-held multi-purpose kitchen tool 100 comprises a first (e.g., front or top) surface 110. As shown in FIG. 4, in some implementations, the hand-held multi-purpose kitchen tool 100 comprises a second (e.g., back or bottom) surface 120. As shown in FIGS. 3 and 4, in some implementations, the hand-held multi-purpose kitchen tool 100 comprises a first side 130, a second side 140, a first end 150, and a second end 160.

As shown in FIG. 3, in some implementations, the hand-held multi-purpose kitchen tool 100 comprises a handle 170. As shown in FIGS. 3 and 4, in some implementations, the hand-held multi-purpose kitchen tool 100 may comprise an elongated opening 180 and/or a clustered opening 190.

In some implementations, the hand-held multi-purpose kitchen tool 100 is at least generally planar panel shaped and/or generally rectangular prism shaped (e.g., rectangular panel shaped). For example, in some implementations, the hand-held multi-purpose kitchen tool 100 comprises and/or is composed of a piece of material (e.g., a body) that is at least generally planar shaped and/or generally rectangular prism shaped.

In some implementations, the hand-held multi-purpose kitchen tool 100 has a length, a width, and a thickness (or depth). In some implementations, the length of the hand-held multi-purpose kitchen tool 100 extends between the first end 150 and the second end 160. In some implementations, the width of the hand-held multi-purpose kitchen tool 100 extends between the first side 130 and the second side 140. In some implementations, the thickness of the hand-held multi-purpose kitchen tool 100 extends between the first surface 110 and the second surface 120.

In some implementations, the length may be greater than the width and the width may be greater than the thickness such that the hand-held multi-purpose kitchen tool 100 is at least generally planar panel shaped and/or generally rectangular prism shaped.

In some implementations, the length may be greater than the width such that the hand-held multi-purpose kitchen tool 100 is at least generally elongated. In some implementations, the width may be greater than the thickness such that the hand-held multi-purpose kitchen tool 100 is at least generally thin.

In some implementations, the hand-held multi-purpose kitchen tool 100 may be any other suitable shape. In some implementations, the hand-held multi-purpose kitchen tool 100 may comprise and/or be composed of any other suitable component.

As shown in FIG. 2, in some implementations, the first surface 110 is opposite the second surface 120. For example, in some implementations, the first surface 110 is at least generally parallel to and/or aligned with the second surface 120. In some implementations, the first surface 110 may have any other suitable position respective to the second surface 120.

As shown in FIG. 3, in some implementations, the first surface 110 extends lengthwise along the hand-held multi-purpose kitchen tool 100 from the first end 150 to the second end 160. In some implementations, the first surface 110 extends widthwise along the hand-held multi-purpose kitchen tool 100 from the first side 130 to the second side 140.

In some implementations, the first surface 110 is at least generally rectangular shaped. In some implementations, the first surface 110 is at least generally flat and/or generally planar. In some implementations, the first surface 110 may be any other suitable shape. In some implementations, the first surface 110 may have any other suitable surface characteristic.

As shown in FIG. 2, in some implementations, the second surface 120 is opposite the first surface 110. For example, in some implementations, the second surface 120 is at least generally parallel to and/or aligned with the first surface 110. In some implementations, the second surface 120 may have any other suitable position respective to the first surface 110.

As shown in FIG. 4, in some implementations, the second surface 120 extends lengthwise along the hand-held multi-purpose kitchen tool 100 from the first end 150 to the second end 160. In some implementations, the second surface 120 extends widthwise along the hand-held multi-purpose kitchen tool 100 from the first side 130 to the second side 140.

In some implementations, the second surface 120 is at least generally rectangular shaped. In some implementations, the second surface 120 is at least generally flat and/or generally planar. In some implementations, the second surface 120 may be any other suitable shape. In some implementations, the second surface 120 may have any other suitable surface characteristic.

In some implementations, the first surface 110 and/or the second surface 120 are each configured to provide a flat or generally flat surface of the hand-held multi-purpose kitchen tool 100. For example, in some implementations, the second surface 120 and/or the first surface 110 are configured such that the hand-held multi-purpose kitchen tool 100 can be used to press, crush, or otherwise compress food, such as garlic, e.g. on a surface, as described more below. In some implementations, the first surface 110 and/or the second surface 120 are configured such that the hand-held multi-purpose kitchen tool 100 can be used to protect a user's fingertips while pressing, crushing, or otherwise preparing (or processing, etc.) such food.

In some implementations, the first surface 110 and/or the second surface 120 may be configured such that the hand-held multi-purpose kitchen tool 100 can be used to provide other suitable food preparation functions, such as described below.

Furthermore, in some implementations, as described more below, the first surface 110 and/or the second surface 120 may be configured such that the hand-held multi-purpose kitchen tool 100 can be used to protect a user's fingertips, and/or other portions of a user's hand, while using the hand-held multi-purpose kitchen tool 100 for other food preparation functions.

As shown in FIGS. 3 and 4, in some implementations, the first side 130 is opposite the second side 140. For example, in some implementations, the first side 130 is at least generally parallel to and/or aligned with the second side 140. In some implementations, the first side 130 may have any other suitable position respective to the second side 140.

In some implementations, the first side 130 extends lengthwise along the hand-held multi-purpose kitchen tool 100 from the first end 150 to the second end 160. In some implementations, the first side 130 extends depthwise along the hand-held multi-purpose kitchen tool 100 from the first surface 110 to the second surface 120.

In some implementations, the first side 130 is straight and/or linear. In some implementations, the first side 130 is at least generally flat and/or generally planar. In some implementations, the first side 130 is at least generally rectangular shaped.

In some implementations, the first side 130 may be any other suitable shape. In some implementations, the first side 130 may have any other suitable surface characteristic.

In some implementations, the first side 130 is configured to provide a straight-edge of the hand-held multi-purpose kitchen tool 100. For example, in some implementations, the first side 130 is configured such that the hand-held multi-purpose kitchen tool 100 can be used to rake or scrape (or otherwise move) food, e.g. across a surface, as described more below. In some implementations, the first side 130 is configured such that the hand-held multi-purpose kitchen tool 100 can be used to protect a user's fingertips while raking, cutting, or otherwise preparing such food.

Furthermore, in some implementations, the first side 130 may be configured such that the hand-held multi-purpose kitchen tool 100 can be used to provide other suitable food preparation functions, such as described below.

As shown in FIGS. 3 and 4, in some implementations, the second side 140 is opposite the first side 130. For example, in some implementations, the second side 140 is at least generally parallel to and/or aligned with the first side 130. In some implementations, the second side 140 may have any other suitable position respective to the first side 130.

In some implementations, the second side 140 extends lengthwise along the hand-held multi-purpose kitchen tool 100 from the first end 150 to the second end 160. In some implementations, the second side 140 extends depthwise along the hand-held multi-purpose kitchen tool 100 from the first surface 110 to the second surface 120.

In some implementations, the second side 140 is curved. For example, as shown in FIGS. 3 and 4, in some implementations, the second side 140 curves inward along the first surface 110 and the second surface 120 as the second side 140 extends from the first end 150 to the second end 160. In some implementations, the second side 140 curves inward in a semi-circular or generally semi-circular shape. In some implementations, the second side 140 curves inward in a concave or generally concave shape.

In some implementations, the second side 140 may be curved in any other suitable way. In some implementations, the second side 140 may be curved in any other suitable shape.

In some implementations, the second side 140 may have any suitable surface characteristic.

As shown in FIGS. 3 and 4, in some implementations, the second side 140 may comprise a cutout portion or cutout 141, a first extension 142, and a second extension 143.

In some implementations, the second side 140 curves inward along the first surface 110 and the second surface 120, as described above, such that the second side 140 forms the cutout 141 into the surfaces 110, 120. In some implementations, the cutout 141 may curve inward along the first surface 110 and the second surface 120 as the second side 140 extends from the first end 150 to the second end 160.

As shown in FIGS. 3 and 4, in some implementations, the cutout 141 may curve inward along the surfaces 110, 120 at least partly as the second side 140 extends between the first end 150 to the second end 160. That is, in some implementations, the first extension 142, the cutout 141, and the second extension 143 extend adjacently from the first end 150 to the second end 160.

In some implementations, the second side 140 extends inward into the first surface 110 and the second surface 120 along the cutout 141. For example, in some implementations, the second side 140 is curved along the cutout 141.

In some implementations, the second side 140 curves inward along the cutout 141 in a semi-circular or generally semi-circular shape. In some implementations, the second side 140 curves inward along the cutout 141 in a semi-circular or generally semi-circular shape. In some implementations, the second side 140 curves inward along the cutout 141 in a concave or generally concave shape.

In some implementations, the second side 140 may be curved in any other suitable way along the cutout 141. In some implementations, the second side 140 may be curved in any other suitable shape along the cutout 141.

In some implementations, the first extension 142 extends from the first end 150 to the cutout 141. In some implementations, the second extension 143 extends from the second end 160 to the cutout 141.

In some implementations, the extensions 142, 143 may be straight or generally straight. In some implementations, the extensions 142, 143 may be linear or generally linear. In some implementations, the extensions 142, 143 may be any other suitable shape.

In some implementations, the second side 140 is configured to provide a curved side or curved-edge of the hand-held multi-purpose kitchen tool 100. In some implementations, the second side 140, comprising the first extension 142, the cutout 141, and the second extension 143 as described above, is configured to provide such curved side or curved edge of the hand-held multi-purpose kitchen tool 100.

For example, in some implementations, the second side 140 is configured such that the hand-held multi-purpose kitchen tool 100 can be used, as described more below, to hold down food, such as carrots or celery (e.g., round/cylindrical or generally round/cylindrical shaped foods), for cutting. In some implementations, the second side 140 may be configured such that the hand-held multi-purpose kitchen tool 100 can be used to protect a user's fingertips while holding down and/or cutting such food.

Furthermore, in some implementations, the second side 140 may be configured such that the hand-held multi-purpose kitchen tool 100 can be used to provide other suitable food preparation functions, such as described below.

As shown in FIGS. 3 and 4, in some implementations, the first end 150 is opposite the second end 160. For example, in some implementations, the first end 150 is at least generally parallel to and/or aligned with the second end 160.

In some implementations, the first end 150 may have any other suitable position respective to the second end 160.

In some implementations, the first end 150 extends lengthwise along the hand-held multi-purpose kitchen tool 100 from the first side 130 to the second side 140. In some implementations, the first end 150 extends depthwise along the hand-held multi-purpose kitchen tool 100 from the first surface 110 to the second surface 120.

As shown in FIGS. 3 and 4, in some implementations, the first end 150 comprises a plurality of peaks (or protrusions) 151 and valleys 152.

In some implementations, the peaks 151 and the valleys 152 are arranged such that the first end 150 resembles a fork or similar kitchen utensil. For example, in some implementations, the peaks 151 and the valleys 152 alternatingly extend across the first end 150 (i.e., adjacent to each other).

In some implementations, a peak 151 is positioned at each end of the first end 150, i.e. adjacent to the first side 130 to the second side 140. In some implementations, one or more of the peaks 151 and the valleys 152 alternatingly extend in between the peaks 151 positioned on each end of the first end 150.

As shown in FIG. 3, in some implementations, the peaks 151 are triangular shaped or generally triangular shaped. For example, in some implementations, the peaks 151 may each comprise a first side 151a (e.g., a base), a second side 151b and a third side 151c (e.g., legs), and an apex 151d.

In some implementations, the first side 151a of the peaks 151 each extend co-linear or generally collinear to the adjacent valley(s) 152 of the first end 150. In some implementations, the second and third sides 151b, 151c extend respectively from each end of the first side 151a to the apex 151d. In some implementations, the apex 151d points or generally points away or opposite from the first end 150.

In some implementations, the apex 151d may have a rounded or generally rounded shape. In some implementations, the apex 151d may have a pointed or generally pointed shape. In some implementations, the apex 151d may have any other suitable shape.

In some implementations, the peaks 151 are configured to secure food during applicable use of the hand-held multi-purpose kitchen tool 100. For example, in some implementations, the apexes 151d of the peaks 151 are configured to grab, pierce, pin down, or otherwise secure food during applicable use of the hand-held multi-purpose kitchen tool 100.

In some implementations, the valleys 152 may be straight or generally straight. In some implementations, the valleys 152 may be linear or generally linear. In some implementations, the valleys 152 may be at least generally flat and/or generally planar. In some implementations, the valleys 152 may be at least generally rectangular shaped.

In some implementations, the valleys 152 may be any other suitable shape. In some implementations, the valleys 152 may have any other suitable surface characteristic.

In some implementations, the first end 150 is configured to provide a fork-end of the hand-held multi-purpose kitchen tool 100. For example, in some implementations, the first end 150 is configured such that the hand-held multi-purpose kitchen tool 100 can be used, as described more below, to pin down or otherwise hold in place food, such as meat, on a surface for cutting. Similarly, in some implementations, the first end 150 is configured such that the hand-held multi-purpose kitchen tool 100 can be used to pull apart and/or shred off (or shred loose) such food (e.g., from a slab or bone).

In some implementations, the first end 150 may be configured such that the hand-held multi-purpose kitchen tool 100 can be used to protect a user's fingertips while holding down and/or otherwise preparing such food. Furthermore, in some implementations, the first end 150 may be configured such that the hand-held multi-purpose kitchen tool 100 can be used to provide other suitable food preparation functions, such as described more below.

As shown in FIGS. 3 and 4, in some implementations, the second end 160 is opposite the first end 150. For example, in some implementations, the second end 160 is at least generally parallel to and/or aligned with the first end 150. In some implementations, the second end 160 may have any other suitable position respective to the first end 150.

In some implementations, the second end 160 extends lengthwise along the hand-held multi-purpose kitchen tool 100 from the first side 130 to the second side 140. In some implementations, the second end 160 extends depthwise along the hand-held multi-purpose kitchen tool 100 from the first surface 110 to the second surface 120.

As shown in FIGS. 3 and 4, in some implementations, the second end 160 comprises a protrusion 161. In some implementations, the second end 160 further comprises a first extension 162 and a second extension 163.

In some implementations, the protrusion 161 extends outward away from the rest of the hand-held multi-purpose kitchen tool 100. In some implementations, the protrusion 161 extends outward along the second end 160 at least partly between the first side 130 and the second side 140. For example, in some implementations, the second end 160 comprises the first extension 162, the protrusion 161, and the second extension 163 extending adjacently from the first side 130 to the second side 140.

In some implementations, the second end 160 extends outward from the first surface 110 and the second surface 120 along the protrusion 161. For example, in some implementations, the second end 160 is curved along the protrusion 161.

In some implementations, the second end 160 curves outward along the protrusion 161 in a half-circular or generally half-circular shape. In some implementations, the second end 160 curves outward along the protrusion 161 in a semi-circular or generally semi-circular shape. In some implementations, the second end 160 curves outward along the protrusion 161 in a convex or generally convex shape.

In some implementations, the second end 160 may be curved in any other suitable way along the protrusion 161. In some implementations, the second end 160 may be curved in any other suitable shape along the protrusion 161.

In some implementations, the first extension 162 extends from the first side 130 to the protrusion 161. In some implementations, the second extension 163 extends from the second side 140 to the protrusion 161.

In some implementations, the extensions 162, 163 may be straight or generally straight. In some implementations, the extensions 162, 163 may be linear or generally linear. In some implementations, the extensions 162, 163 may be at least generally flat and/or generally planar. In some implementations, the extensions 162, 163 may be at least generally rectangular shaped.

In some implementations, the extensions 162, 163 may be any other suitable shape. In some implementations, the extensions 162, 163 may have any other suitable surface characteristic.

In some implementations, the second end 160 is configured to provide a cup-end or juicing-end of the hand-held multi-purpose kitchen tool 100. For example, in some implementations, the second end 160 is configured such that the hand-held multi-purpose kitchen tool 100 can be used, as described more below, to cup or juice food, such as a lemon or a lime, to extract or otherwise obtain the juice, liquid, or similar content from the food. Furthermore, in some implementations, the second end 160 may be configured such that the hand-held multi-purpose kitchen tool 100 can be used to provide other suitable food preparation functions, such as described more below.

As shown in FIG. 3, in some implementations, the handle 170 extends from the first surface 110. In some implementations, the handle 170 may extend from any other suitable component of the hand-held multi-purpose kitchen tool 100, such as the second surface 120.

In some implementations, the handle 170 may be attached to the first surface 110. For example, as shown in FIG. 4, the handle may be attached to the first surface 110 by a screw or other suitable fastener 173. In some implementations, the handle 170 may extend from the first surface 110 in any other suitable way.

In some implementations, the handle 170 extends from the first surface 110 positioned midway or generally midway along the length of the hand-held multi-purpose kitchen tool 100, which extends between the first end 150 and the second end 160 as described above.

In some implementations, the handle 170 extends from the first surface 110 positioned midway or generally midway along the width of the hand-held multi-purpose kitchen tool 100, which extends between the first side 130 and the second side 140 as described above.

In some implementations, the handle 170 may extend from the first surface 110 at any other suitable position of the hand-held multi-purpose kitchen tool 100.

In some implementations, the handle 170 may be any suitable type of handle. In some implementations, the handle 170 may be any suitable style of handle.

In some implementations, the handle 170 may be any suitable shape. In some implementations, the handle 170 may be any suitable size.

In some implementations, the handle 170 may have any suitable configuration. For example, in some implementations, the handle may have a single component configuration. In some implementations, the handle may have a multiple component configuration.

In some implementations, the handle 170 may have any other suitable features.

As shown in FIG. 2, in some implementations, an example handle 170 may comprise a first component 171 and a second component 172.

In some implementations, the first component 171 may be attached to the first surface 110. In some implementations, the first component 171 may otherwise extend from the first surface 110.

In some implementations, the first component 171 may be trapezoidal prism shaped or generally trapezoidal prism shaped. For example, as shown in FIG. 2, in some implementations, the first component 171 may comprise a downward facing surface 171*a*, an upward facing surface 171*b*, a first side facing surface 171*c*, a second side facing surface 171*d*, a first end facing surface 171*e*, and a second end facing surface 171*f*.

As shown in FIG. 2, in some implementations, the downward facing surface 171*a* and the upward facing surface 171*b* are positioned opposite each other. In some implementations, the first side facing surface 171*c* and the second side facing surface 171*d* are positioned opposite each other. In some implementations, the first end facing surface 171*e* and the second end facing surface 171*f* are positioned opposite each other. In some implementations, the surfaces 171*a*, 171*b*, 171*c*, 171*d*, 171*e*, 171*f* may have any other suitable respective positioning.

In some implementations, the first component 171 is positioned such that the downward facing surface 171*a* faces toward the first surface 110 of the hand-held multi-purpose kitchen tool 100. In some implementations, the first component 171 is positioned such that the upward facing surface 171*b* faces away from the first surface 110.

In some implementations, the first component 171 is positioned such that the first side facing surface 171*c* faces toward the first side 130. In some implementations, the first component 171 is positioned such that the second side facing surface 171*d* faces away from the second side 140.

In some implementations, the first component 171 is positioned such that the first end facing surface 171*e* faces toward the first end 150. In some implementations, the first component 171 is positioned such that the second end facing surface 171*f* faces away from the second end 160.

In some implementations, the surfaces 171*a*, 171*b*, 171*c*, 171*d*, 171*e*, 171*f* of the first component 171 may each be rectangular shaped or generally rectangular shaped. That is, in some implementations, the surfaces 171*a*, 171*b*, 171*c*, 171*d*, 171*e*, 171*f* each comprise a length and a width that are perpendicular or generally perpendicular to each other respectively. In some implementations, the surfaces 171*a*, 171*b*, 171*c*, 171*d*, 171*e*, 171*f* may have any other suitable shape.

As shown in FIG. 2, in some implementations, the length of the upward facing surface 171*b* is longer than the length of the downward facing surface 171*a*. Alternately, as shown in FIG. 3, in some implementations, the length of the downward facing surface 171*a* may be longer than the length of the upward facing surface 171*b*. In some implementations, the length of the downward facing surface 171*a* may be may be the same as the length of the upward facing surface 171*b*.

As shown in FIG. 2, in some implementations, the width of the upward facing surface 171*b* is longer than the width of the downward facing surface 171*a*. Alternately, as shown in FIG. 3, in some implementations, the width of the downward facing surface 171*a* may be longer than the width of the upward facing surface 171*b*. In some implementations, the width of the downward facing surface 171*a* may be the same as the width of the upward facing surface 171*b*.

As shown in FIG. 2, in some implementations, the length of the first side facing surface 171*c* is the same as the length of the second side facing surface 171*d*. In some implementations, the length of the first side facing surface 171*c* may be longer than the length of the second side facing surface 171*d*. In some implementations, the length of the second side facing surface 171*d* may be longer than the length of the first side facing surface 171*c*.

In some implementations, the width of the first side facing surface 171*c* is the same as the width of the second side facing surface 171*d*. In some implementations, the width of the first side facing surface 171*c* may be longer than the width of the second side facing surface 171*d*. In some implementations, the width of the second side facing surface 171*d* may be longer than the width of the first side facing surface 171*c*.

As shown in FIG. 2, in some implementations, the length of the first end facing surface 171*e* is the same as the length of the second end facing surface 171*f*. In some implementations, the length of the first end facing surface 171*e* may be longer than the length of the second end facing surface 171*f*. In some implementations, the length of the second end facing surface 171*f* may be longer than the length of the first end facing surface 171*e*.

In some implementations, the width of the first end facing surface 171*e* is the same as the width of the second end facing surface 171*f*. In some implementations, the width of the first end facing surface 171*e* may be longer than the width of the second end facing surface 171*f*. In some implementations, the width of the second end facing surface 171*f* may be longer than the width of the first end facing surface 171*e*.

As shown in FIG. 2, in some implementations, the downward facing surface 171*a* and the upward facing surface 171*b* are each flat or planar. In some implementations, the downward facing surface 171*a* and the upward facing surface 171*b* are each at least generally flat or generally planar. In some implementations, the downward facing surface 171*a* and the upward facing surface 171*b* may each have any other suitable surface characteristic.

As shown in FIG. 2, in some implementations, the first side facing surface 171*c* and the second side facing surface 171*d* each curve inward toward the hand-held multi-purpose kitchen tool 100 as the surfaces 171*c*, 171*d* extend respectively from the downward facing surface 171*a* to the upward facing surface 171*b*. In some implementations, the first side facing surface 171*c* and the second side facing surface 171*d* each curve inward in a semi-circular or generally semi-circular shape. In some implementations, the first side facing surface 171*c* and the second side facing surface 171*d* each curve inward in a concave or generally concave shape.

In some implementations, the first side facing surface 171*c* and the second side facing surface 171*d* may each curve inward in any other suitable way. In some implementations, the first side facing surface 171*c* and the second side facing surface 171*d* may each curve inward in any other suitable shape.

In some implementations, the first side facing surface 171*c* and the second side facing surface 171*d* may each extend respectively from the downward facing surface 171*a* to the upward facing surface 171*b* in any other suitable way. In some implementations, the first side facing surface 171*c* and the second side facing surface 171*d* may each extend respectively from the downward facing surface 171*a* to the upward facing surface 171*b* in any other suitable shape.

As shown in FIG. 2, in some implementations, the first end facing surface 171*e* and the second end facing surface 171*f* each curve inward toward the hand-held multi-purpose kitchen tool 100 as the surfaces 171*c*, 171*d* extend respectively from the downward facing surface 171*a* to the upward facing surface 171*b*. In some implementations, the first end facing surface 171*e* and the second end facing surface 171*f* each curve inward in a semi-circular or generally semi-circular shape. In some implementations, the first end facing surface 171*e* and the second end facing surface 171*f* each curve inward in a concave or generally concave shape.

In some implementations, the first end facing surface 171*e* and the second end facing surface 171*f* may each curve inward in any other suitable way. In some implementations, the first end facing surface 171*e* and the second end facing surface 171*f* may each curve inward in any other suitable shape.

In some implementations, the first end facing surface 171*e* and the second end facing surface 171*f* may each extend respectively from the downward facing surface 171*a* to the upward facing surface 171*b* in any other suitable way. In some implementations, the first end facing surface 171*e* and the second end facing surface 171*f* may each extend respectively from the downward facing surface 171*a* to the upward facing surface 171*b* in any other suitable shape.

In some implementations, the second component 172 may be attached to the first component 171. In some implementations, the second component 172 may otherwise extend from the first component 171. For example, as shown in FIG. 2, in some implementations, the second component 172 extends from the upward facing surface 172*b* of the first component 171.

In some implementations, the second component 172 may be rectangular prism shaped or generally rectangular prism shaped. For example, as shown in FIG. 2, in some implementations, the second component 172 may comprise a downward facing surface 172*a*, an upward facing surface 172*b*, a first side facing surface 172*c*, a second side facing surface 172*d*, a first end facing surface 172*e*, and a second end facing surface 172*f*.

As shown in FIG. 2, in some implementations, the downward facing surface 172*a* and the upward facing surface 172*b* are positioned opposite each other. In some implementations, the first side facing surface 172*c* and the second side facing surface 172*d* are positioned opposite each other. In some implementations, the first end facing surface 172*e* and the second end facing surface 172*f* are positioned opposite each other. In some implementations, the surfaces 172*a*, 172*b*, 172*c*, 172*d*, 172*e*, 172*f* may have any other suitable respective positioning.

In some implementations, the second component 172 is positioned such that the downward facing surface 172*a* faces toward the first surface 110 of the hand-held multi-purpose kitchen tool 100. In some implementations, the second component 172 is positioned such that the upward facing surface 172*b* faces away from the first surface 110.

In some implementations, the second component 172 is positioned such that the first side facing surface 172*c* faces toward the first side 130. In some implementations, the second component 172 is positioned such that the second side facing surface 172*d* faces away from the second side 140.

In some implementations, the second component 172 is positioned such that the first end facing surface 172*e* faces toward the first end 150. In some implementations, the second component 172 is positioned such that the second end facing surface 172*f* faces away from the second end 160.

In some implementations, the surfaces 172*a*, 172*b*, 172*c*, 172*d*, 172*e*, 172*f* of the second component 172 may each be rectangular shaped or generally rectangular shaped. That is, in some implementations, the surfaces 172*a*, 172*b*, 172*c*, 172*d*, 172*e*, 172*f* each comprise a length and a width that are perpendicular or generally perpendicular to each other respectively. In some implementations, the surfaces 172*a*, 172*b*, 172*c*, 172*d*, 172*e*, 172*f* may have any other suitable shape.

As shown in FIG. 2, in some implementations, the length of the downward facing surface 172*a* is the same as the length of the upward facing surface 172*b*. In some implementations, the length of the upward facing surface 172*b* may be longer than the length of the downward facing surface 172*a*. In some implementations, the length of the downward facing surface 172*a* may be longer than the length of the upward facing surface 172*b*.

In some implementations, the width of the downward facing surface 172*a* is the same as the width of the upward facing surface 172*b*. In some implementations, the width of the upward facing surface 172*b* may be longer than the width of the downward facing surface 172*a*. In some implementations, the width of the downward facing surface 172*a* may be longer than the width of the upward facing surface 172*b*.

As shown in FIG. 2, in some implementations, the length of the first side facing surface 172*c* is the same as the length of the second side facing surface 172*d*. In some implementations, the length of the first side facing surface 172*c* may be longer than the length of the second side facing surface 172*d*. In some implementations, the length of the second side facing surface 172*d* may be longer than the length of the first side facing surface 172*c*.

In some implementations, the width of the first side facing surface 172*c* is the same as the width of the second side facing surface 172*d*. In some implementations, the width of the first side facing surface 172*c* may be longer than the width of the second side facing surface 172*d*. In some implementations, the width of the second side facing surface 172*d* may be longer than the width of the first side facing surface 172*c*.

As shown in FIG. 2, in some implementations, the length of the first end facing surface 172*e* is the same as the length of the second end facing surface 172*f*. In some implementations, the length of the first end facing surface 172*e* may be longer than the length of the second end facing surface 172*f*. In some implementations, the length of the second end facing surface 172*f* may be longer than the length of the first end facing surface 172*e*.

In some implementations, the width of the first end facing surface 172*e* is the same as the width of the second end facing surface 172*f*. In some implementations, the width of the first end facing surface 172*e* may be longer than the width of the second end facing surface 172*f*. In some implementations, the width of the second end facing surface 172*f* may be longer than the width of the first end facing surface 172*e*.

As shown in FIG. 2, in some implementations, the downward facing surface 172*a* is flat or planar. In some implementations, the downward facing surface 172*a* is at least generally flat or generally planar. In some implementations, the downward facing surface 172*a* may have any other suitable surface characteristic.

In some implementations, the upward facing surface 172*b* curves outward away from the downward facing surface 172*a* as the upward facing surface 172*b* extends from the first end facing surface 172*e* to the second end facing surface 172*f*. In some implementations, the upward facing surface 172*b* curves outward in a semi-circular or generally semi-circular shape. In some implementations, the upward facing surface 172*b* curves outward in a convex or generally convex shape.

In some implementations, the upward facing surface 172*b* may curve outward in any other suitable way. In some implementations, the upward facing surface 172*b* may curve outward in any other suitable shape.

In some implementations, the upward facing surface 172*b* may extend from the first end facing surface 172*e* to the second end facing surface 172*f* in any other suitable way. In some implementations, the upward facing surface 172*b* may extend from the first end facing surface 172*e* to the second end facing surface 172*f* in any other suitable shape.

As shown in FIG. 2, in some implementations, the first side facing surface 172*c* and the second side facing surface 172*d* are each flat or planar. In some implementations, the first side facing surface 172*c* and the second side facing surface 172*d* are each at least generally flat or generally planar. In some implementations, the first side facing surface 172*c* and the second side facing surface 172*d* may each have any other suitable surface characteristic.

In some implementations, the first side facing surface 172*c* and the second side facing surface 172*d* each extend from the downward facing surface 172*a* to the upward facing surface 172*b*. In some implementations, the first side facing surface 172*c* and the second side facing surface 172*d* each extend upward to the upward facing surface 172*b* in a curved shape that corresponds to the curved shape of the upward facing surface 172*b*.

In some implementations, the first side facing surface 172*c* and the second side facing surface 172*d* each extend upward to the upward facing surface 172*b* in a semi-circular or generally semi-circular shape. In some implementations, the first side facing surface 172*c* and the second side facing surface 172*d* each extend upward to the upward facing surface 172*b* in a convex or generally convex shape.

In some implementations, the first side facing surface 172*c* and the second side facing surface 172*d* may each extend upward to the upward facing surface 172*b* in any other suitable way. In some implementations, the first side facing surface 172*c* and the second side facing surface 172*d* may each extend upward to the upward facing surface 172*b* in any other suitable shape.

In some implementations, the first side facing surface 172*c* and the second side facing surface 172*d* may each extend from the downward facing surface 172*a* to the upward facing surface 172*b* in any other suitable way. In some implementations, the first side facing surface 172*c* and the second side facing surface 172*d* may each extend from the downward facing surface 172*a* to the upward facing surface 172*b* in any other suitable shape.

As shown in FIG. 2, in some implementations, the first end facing surface 172*e* and the second end facing surface 172*f* are each flat or planar. In some implementations, the first end facing surface 172*e* and the second end facing surface 172*f* are each at least generally flat or generally planar. In some implementations, the first end facing surface 172*e* and the second end facing surface 172*f* may each have any other suitable surface characteristic.

In some implementations, the handle 170 is configured to allow a user to hold the hand-held multi-purpose kitchen tool 100. In some implementations, the handle 170 is configured to allow a user to use the hand-held multi-purpose kitchen tool 100. For example, in some implementations, the handle 170 is configured such that the hand-held multi-purpose kitchen tool 100 can be used, as described more below, to prepare food, such as to hold down the food for cutting.

In some implementations, the handle 170 is configured such that the hand-held multi-purpose kitchen tool 100 can be used to protect a user's fingertips while using the hand-held multi-purpose kitchen tool 100 to prepare food, such as to protect the user's fingertips while cutting the food.

In some implementations, the handle 170 may be configured for any other suitable use with respect to the hand-held multi-purpose kitchen tool 100.

As shown in FIGS. 3 and 4, in some implementations, the elongated opening 180 extends through the hand-held multi-purpose kitchen tool 100 including through the first surface 110 and the second surface 120.

In some implementations, the elongated opening 180 is rectangular prism shaped or generally rectangular prism shaped extending through the hand-held multi-purpose kitchen tool 100. For example, in some implementations, the elongated opening 180 comprises a first side facing surface 180c, a second side facing surface 180d, a first end facing surface 180e, and a second end facing surface 180f.

In some implementations, the elongated opening 180 may be any other suitable shape.

In some implementations, the elongated opening 180 extends lengthwise between the first side facing surface 180c and the second side facing surface 180d. In some implementations, the elongated opening 180 extends widthwise between the first end facing surface 180e and the second end facing surface 180f. In some implementations, the elongated opening 180 extends depthwise from the first surface 110 to the second surface 120.

In some implementations, the length of the elongated opening 180 is greater than the width of the elongated opening 180. In some implementations, the width of the elongated opening 180 is greater than the thickness (or depth) of the elongated opening 180.

In some implementations, the elongated opening 180 may be the same or similar to an elongated slot extending through the hand-held multi-purpose kitchen tool 100. In some implementations, the elongated opening 180 may be the same or similar to an elongated slit extending through the hand-held multi-purpose kitchen tool 100. That is, in some implementations, the first end facing surface 180e and the second end facing surface 180f are longer than the first side facing surface 180c and the second side facing surface 180d such that the elongated opening 180 is the same or similar to a slot or a slit extending through the hand-held multi-purpose kitchen tool 100.

As shown in FIG. 3, in some implementations, the elongated opening 180 is positioned adjacent to the first end 150. In some implementations, the elongated opening 180 is positioned adjacent to the first end 150 between the first end 150 and the handle 170.

In some implementations, the elongated opening 180 is positioned more adjacent to the first end 150 than to the handle 170. In some implementations, the elongated opening 180 is so positioned at or generally at one-third of the distance between the first end 150 and the handle 170 lengthwise along the hand-held multi-purpose kitchen tool 100.

In some implementations, the elongated opening 180 may be positioned at or generally at one-half of the distance (or midway) between the first end 150 and the handle 170 lengthwise along the hand-held multi-purpose kitchen tool 100.

In some implementations, the elongated opening 180 is further positioned centered or generally centered between the first side 130 and the second side 140 of the hand-held multi-purpose kitchen tool 100.

In some implementations, the elongated opening 180 may be positioned in any other suitable location between the first end 150 and the handle 170. In some implementations, the elongated opening 180 may be further positioned in any other suitable location between the first side 130 and the second side 140. In some implementations, the elongated opening 180 may be positioned in any other suitable location of the hand-held multi-purpose kitchen tool 100.

As shown in FIG. 3, in some implementations, the first side facing surface 180c and the second side facing surface 180d are positioned opposite each other. In some implementations, the first end facing surface 180e and the second end facing surface 180f are positioned opposite each other. In some implementations, the surfaces 180c, 180d, 180e, 180f may have any other suitable respective positioning.

In some implementations, the elongated opening 180 is positioned such that the first side facing surface 180c extends parallel or generally parallel to the first side 130. In some implementations, the elongated opening 180 is positioned such that the second side facing surface 180d extends parallel or generally parallel to the second side 140.

In some implementations, the elongated opening 180 is positioned such that the first end facing surface 180e extends parallel or generally parallel to the first end 150. In some implementations, the elongated opening 180 is positioned such that the second end facing surface 180f extends parallel or generally parallel to the second end 160.

In some implementations, the surfaces 180c, 180d, 180e, 180f of the elongated opening 180 may each be rectangular shaped or generally rectangular shaped. That is, in some implementations, the surfaces 180c, 180d, 180e, 180f each comprise a length and a width that are perpendicular or generally perpendicular to each other respectively. In some implementations, the surfaces 180c, 180d, 180e, 180f may have any other suitable shape.

As shown in FIG. 2, in some implementations, the first side facing surface 180c and the second side facing surface 180d are each flat or planar. In some implementations, the first side facing surface 180c and the second side facing surface 180d are each at least generally flat or generally planar. In some implementations, the first side facing surface 180c and the second side facing surface 180d 180b may each have any other suitable surface characteristic.

In some implementations, the first end facing surface 180e and the second side facing surface 180d are each flat or planar. In some implementations, the first end facing surface 180e and the second end facing surface 180f are each at least generally flat or generally planar. In some implementations, the first end facing surface 180e and the second end facing surface 180f may each have any other suitable surface characteristic.

In some implementations, the elongated opening 180 is configured to provide a slicer of the hand-held multi-purpose kitchen tool 100. For example, in some implementations, the elongated opening 180 is configured such that the hand-held multi-purpose kitchen tool 100 can be used to slice or cut food, such as cheese, as described more below. In some implementations, the elongated opening 180 is configured such that the hand-held multi-purpose kitchen tool 100 can be used to protect a user's fingertips while slicing or otherwise preparing such food.

Furthermore, in some implementations, the elongated opening 180 may be configured such that the hand-held multi-purpose kitchen tool 100 can be used to provide other suitable food preparation functions, such as described below.

In some implementations, the elongated opening 180 is configured to provide a slicer of the hand-held multi-purpose kitchen tool 100 by the dimensional configuration of the elongated opening 180. For example, as described above, in some implementations, the depth of the elongated opening 180 is less than the width of the elongated opening 180 and the width of the elongated opening 180 is less than the length of the elongated opening 180.

Thereby, in some implementations, the elongated opening 180 is configured dimensionally such that the hand-held multi-purpose kitchen tool 100 can be used to slice food by a motioning of the elongated opening 180 along a portion of the food, as described more below. Similarly, in some implementations, the elongated opening 180 may be configured such that the hand-held multi-purpose kitchen tool 100 can also be used to shave or peel food.

In some implementations, the elongated opening 180 may be configured to provide a slicer of the hand-held multi-purpose kitchen tool 100 by a feature of one or more of the surfaces 180c, 180d, 180e, 180f of the elongated opening 180. For example, in some implementations, the first end facing surface 180e and/or the second end facing surface 180f may be sharp or otherwise configured such that the elongated opening 180 slices food by a motioning along a portion of the food. In some implementations, the elongated opening 180 may comprise any other suitable feature such that the elongated opening 180 is configured to provide a slicer of the hand-held multi-purpose kitchen tool 100.

As shown in FIG. 3, in some implementations, the clustered opening 190 comprises a first side 190c, a second side 190d, a first end 190e, and a second end 190f. In some implementations, the clustered opening 190 comprises a plurality of holes or openings 191. In some implementations, the clustered opening 190 comprises a plurality of first spacings 192 and/or a plurality of second spacings 193. In some implementations, the clustered opening 190 comprises one or more rows 190g and/or one or more columns 190h.

As shown in FIG. 3, in some implementations, the clustered opening 190 is positioned adjacent to the second end 160. In some implementations, the clustered opening 190 is positioned adjacent to the second end 160 such that clustered opening 190 extends at least partly onto the protrusion 161. In some implementations, the clustered opening 190 is positioned adjacent to the second end 160 between the second end 160 and the handle 170.

In some implementations, the clustered opening 190 is positioned more adjacent to the second end 160 than to the handle 170. In some implementations, the clustered opening 190 is so positioned at or generally at one-third of the distance between the second end 160 and the handle 170 lengthwise along the hand-held multi-purpose kitchen tool 100.

In some implementations, the clustered opening 190 may be positioned at or generally at one-half of the distance (or midway) between the second end 160 and the handle 170 lengthwise along the hand-held multi-purpose kitchen tool 100.

In some implementations, the clustered opening 190 is further positioned centered or generally centered between the first side 130 and the second side 140 of the hand-held multi-purpose kitchen tool 100.

In some implementations, the clustered opening 190 may be positioned in any other suitable location between the second end 160 and the handle 170. In some implementations, the clustered opening 190 may be further positioned in any other suitable location between the first side 130 and the second side 140. In some implementations, the clustered opening 190 may be positioned in any other suitable location of the hand-held multi-purpose kitchen tool 100.

In some implementations, the clustered opening 190 extends lengthwise between the first side 190c and the second side 190d. In some implementations, the clustered opening 190 extends widthwise between the first end 190e and the second end 190f. In some implementations, the clustered opening 190 extends depthwise (i.e., through the openings 191) from the first surface 110 to the second surface 120.

In some implementations, the length of the clustered opening 190 is greater than the width of the clustered opening 190. In some implementations, the width of the clustered opening 190 is greater than the thickness (or depth) of the clustered opening 190 (i.e., through the openings 191).

In some implementations, the clustered opening 190 extends through the hand-held multi-purpose kitchen tool 100 including through the first surface 110 and the second surface 120. For example, as shown in FIGS. 3 and 4, in some implementations, the openings 191 of the clustered opening 190 extend through the hand-held multi-purpose kitchen tool 100 including through the first surface 110 and the second surface 120.

In some implementations, the clustered opening 190 is rectangular shaped or generally rectangular shaped extending through the hand-held multi-purpose kitchen tool 100. That is, as shown in FIG. 3, in some implementations, the sides 190c, 190d, 190e, 190f are configured in a rectangular shape or a generally rectangular shape. In some implementations, the clustered opening 190 may be any other suitable shape.

As shown in FIG. 3, in some implementations, the first side 190c and the second side 190d are positioned opposite each other. In some implementations, the first end 190e and the second end 190f are positioned opposite each other. In some implementations, the sides 190c, 190d, 190e, 190f may have any other suitable respective positioning.

In some implementations, the clustered opening 190 is positioned such that the first side 190c extends parallel or generally parallel to the first side 130. In some implementations, the clustered opening 190 is positioned such that the second side 190d extends parallel or generally parallel to the second side 140.

In some implementations, the clustered opening 190 is positioned such that the first end 190e extends parallel or generally parallel to the first end 150. In some implementations, the clustered opening 190 is positioned such that the second end 190f extends parallel or generally parallel to the second end 160.

As shown in FIGS. 2 and 3, in some implementations, the openings 191 of the clustered opening 190 may be cylindrical shaped. For example, the openings 191 may be round or circular shaped through each surface 110, 120 and cylindrical shaped extending therebetween the surfaces 110, 120. Similarly, in some implementations, the openings 191 may be generally cylindrical shaped.

In some implementations, the openings 191 may be any other suitable shape. In some implementations, the openings 191 may be any two or more different suitable shapes, e.g. arranged in any suitable configuration.

In some implementations, the openings 191 may be shaped such that the clustered opening 190 can comprise any determined or otherwise suitable number of the openings 191. In some implementations, the openings 191 may be shaped such that the clustered opening 190 can comprise any determined or otherwise suitable configuration of the openings 191, which may also include any suitable configuration of the first spacings 192 and/or the second spacings 193, such as described below.

In some implementations, the openings 191 may be shaped such that the clustered opening 190 can provide any intended or otherwise suitable use of the hand-held multi-purpose kitchen tool 100, such as described below.

In some implementations, the openings 191 of the clustered opening 190 may have any suitable size. For example, in some implementations, the openings 191 may be sized such that the clustered opening 190 can comprise any determined or otherwise suitable number of the openings 191. In some implementations, the openings 191 may be sized such that the clustered opening 190 can comprise any determined or otherwise suitable configuration of the openings 191, which may also include any suitable configuration of the first spacings 192 and/or the second spacings 193, such as described below.

In some implementations, the openings 191 may be sized such that the clustered opening 190 can provide any intended or otherwise suitable use of the hand-held multi-purpose kitchen tool 100, such as described below.

As shown in FIG. 2, in some implementations, the clustered opening 190 may comprise thirty-two (32) openings 191. As shown in FIG. 3, in some implementations, the clustered opening 190 may comprise thirty-three (33) openings 191. In some implementations, the clustered opening 190 may comprise any other suitable plurality of two or more openings 191.

As shown in FIGS. 2 and 3, in some implementations, the one or more rows 190g extend lengthwise along the clustered opening 190 (i.e., between the first side 190c and the second side 190d). In some implementations, the one or more columns 190h extend widthwise along the clustered opening 190 (i.e., between the first end 190e and the second end 190O).

As shown in FIGS. 2 and 3, in some implementations, the openings 191 of the clustered opening 190 are aligned in the one or more rows 190g and/or in the one or more columns 190h. That is, in some implementations, the openings 191 are aligned straight or generally straight in the rows 190g and in the columns 190h.

In some implementations, the openings 191 may also be aligned straight or generally straight extending diagonally across the length and/or the width of the clustered opening 190.

In some implementations, the openings 191 may be aligned straight or generally straight in any other suitable configuration. In some implementations, the openings 191 may be aligned in any other suitable way.

In some implementations, the openings 191 are positioned spaced apart. For example, as described below, in some implementations, the openings 191 are positioned spaced apart in the rows 190g and columns 190h with respect to the first spacings 192 and the second spacings 193.

As shown in FIG. 2, in some implementations, the clustered opening 190 may comprise seven (7) rows 190g of openings 191. In some implementations, some of the rows 190g may comprise five (5) openings 191 and some of the rows 190g may comprise four (4) openings 191.

For example, in some implementations, traversing widthwise from the first end 190e to the second end 190f, the first, third, fifth, and seventh rows 190g may each comprise five (5) openings 191. Similarly, in some implementations, the second, fourth, and sixth rows 190g may each comprise four (4) openings 191. Thereby, in some implementations, the number of openings 191 in the rows 190g may alternate between five (5) openings 191 and four (4) openings 191 accordingly.

Furthermore, in some implementations, each of the rows 190g may be centered or generally centered between the first side 190c and the second side 190d. Thereby, in some implementations, the openings 191 in adjacent rows 190g are diagonally offset or staggered traversing widthwise from the first end 190e to the second end 190f.

As shown in FIG. 3, in some implementations, the clustered opening 190 may comprise six (6) rows 190g of openings 191. In some implementations, some of the rows 190g may comprise six (6) openings 191 and some of the rows 190g may comprise five (5) openings 191.

For example, in some implementations, traversing widthwise from the first end 190e to the second end 190f, the first, third, and fifth, rows 190g may each comprise six (6) openings 191. Similarly, in some implementations, the second, fourth, and sixth rows 190g may each comprise five (5) openings 191. Thereby, in some implementations, the number of openings 191 in the rows 190g may alternate between five (5) openings 191 and five (5) openings 191 accordingly.

Furthermore, in some implementations, each of the rows 190g may be centered or generally centered between the first side 190c and the second side 190d. Thereby, in some implementations, the openings 191 in adjacent rows 190g are diagonally offset or staggered traversing widthwise from the first end 190e to the second end 190f.

In some implementations, the clustered opening 190 may comprise any other suitable number of rows 190g. In some implementations, the rows 190g may comprise any other suitable number of openings 191.

In some implementations, the number of openings 191 in each row 190g may alternate in any other suitable configuration.

In some implementations, the rows 190g may be positioned in any suitable way with respect to one or more of the sides 190c, 190d, 190e, 190f of the clustered opening 190.

In some implementations, the openings 191 in adjacent rows 190g may be positioned in any other suitable way respective each other.

As shown in FIG. 2, in some implementations, the clustered opening 190 may comprise nine (9) columns 190h of openings 191. In some implementations, some of the columns 190h may comprise four (4) openings 191 and some of the columns 190h may comprise three (3) openings 191.

For example, in some implementations, traversing lengthwise from the first side 190c to the second side 190d, the first, third, fifth, seventh, and ninth columns 190h may each comprise four (4) openings 191. Similarly, in some implementations, the second, fourth, sixth, and eighth columns 190h may each comprise three (3) openings 191. Thereby, in some implementations, the number of openings 191 in the columns 190h may alternate between four (4) openings 191 and three (3) openings 191 accordingly.

Furthermore, in some implementations, each of the columns 190h may be centered or generally centered between the first end 190e and the second end 190f. Thereby, in some implementations, the openings 191 in adjacent columns 190h are diagonally offset or staggered traversing lengthwise from the first side 190c to the second side 190d.

As shown in FIG. 3, in some implementations, the clustered opening 190 may comprise eleven (11) columns 190h of openings 191. In some implementations, each of the columns 190h may comprise three (3) openings 191.

In some implementations, the openings 191 in adjacent columns 190h may be diagonally offset or staggered traversing lengthwise from the first side 190c to the second side 190d. For example, in some implementations, traversing lengthwise from the first side 190c to the second side 190d, the first, third, fifth, seventh, ninth, and eleventh columns 190h may each extend widthwise along the clustered opening 190 positioned more adjacent to the first end 190e.

Similarly, the second, fourth, sixth, eight, and tenth columns 190h may each extend widthwise along the clustered opening 190 positioned more adjacent to the second end 190f. Thereby, in some implementations, the openings 191 in adjacent columns 190h are diagonally offset or staggered traversing lengthwise from the first side 190c to the second side 190d.

In some implementations, the clustered opening 190 may comprise any other suitable number of columns 190h. In some implementations, the columns 190h may comprise any other suitable number of openings 191.

In some implementations, the number of openings 191 in each column 190*h* may alternate in any other suitable configuration.

In some implementations, the columns 190*h* may be positioned in any suitable way with respect to one or more of the sides 190*c*, 190*d*, 190*e*, 190*f* of the clustered opening 190.

In some implementations, the openings 191 in adjacent columns 190*h* may be positioned in any other suitable way respective each other.

As shown in FIGS. 2 and 3, in some implementations, the first spacings 192 and the second spacings 193 may be positioned between the openings 191. For example, in some implementations, a first spacing 192 is positioned alternately between each of the adjacent openings 191 extending lengthwise along each row 190*g*. Similarly, in some implementations, a second spacing 193 is positioned alternately between each of the adjacent openings 191 extending widthwise along each column 190*h*. Thereby, in some implementations, the rows 190*g* and columns 190*h* of openings 191 are positioned and otherwise configured as described above.

In some implementations, a first spacing 192 may also be positioned between each opening 191 and respective adjacent side 190*c*, 190*d* along each row 190*g*. Similarly, in some implementations, a second spacing 193 may also be positioned between each opening 191 and respective adjacent side 190*e*, 190*f* along each column 190*h*.

In some implementations, the first spacings 192 and the second spacings 193 may be positioned in any other suitable configuration, such as with respect to the openings 191, the sides 190*c*, 190*d*, 190*e*, 190*f*, and/or other components of the clustered opening 190.

As shown in FIGS. 2 and 3, in some implementations, the first spacings 192 and the second spacings 193 are shaped respective to one or more features of the openings 191. For example, in some implementations, the first spacings 192 and the second spacings 193 may be shaped respective to the shape of the openings 191. In some implementations, the first spacings 192 and the second spacings 193 may be shaped respective to the size of the openings 191. In some implementations, the first spacings 192 and the second spacings 193 may be shaped respective to the positioning or other configuration of the openings 191.

In some implementations, the first spacings 192 and the second spacings 193 may also be shaped respective to the features of the sides 190*c*, 190*d*, 190*e*, 190*f* and/or other components of the clustered opening 190.

Similarly, as shown in FIGS. 2 and 3, in some implementations, the first spacings 192 and the second spacings 193 are sized respective to one or more features of the openings 191. For example, in some implementations, the first spacings 192 and the second spacings 193 may be sized respective to the size of the openings 191. In some implementations, the first spacings 192 and the second spacings 193 may be sized respective to the shape of the openings 191. In some implementations, the first spacings 192 and the second spacings 193 may be sized respective to the positioning or other configuration of the openings 191.

In some implementations, the first spacings 192 and the second spacings 193 may also be sized respective to the features of the sides 190*c*, 190*d*, 190*e*, 190*f* and/or other components of the clustered opening 190.

In some implementations, the clustered opening 190 is configured to provide a zester of the hand-held multi-purpose kitchen tool 100. For example, in some implementations, the clustered opening 190 is configured such that the hand-held multi-purpose kitchen tool 100 can be used to zest food, such as a lemon or lime, as described more below. In some implementations, the clustered opening 190 is configured such that the hand-held multi-purpose kitchen tool 100 can be used to protect a user's fingertips while zesting such food.

In some implementations, the clustered opening 190 is configured to provide a grater and/or a shredder of the hand-held multi-purpose kitchen tool 100. For example, in some implementations, the clustered opening 190 is configured such that the hand-held multi-purpose kitchen tool 100 can be used to grate and/or shred food, such as cheese, as described more below. In some implementations, the clustered opening 190 is configured such that the hand-held multi-purpose kitchen tool 100 can be used to protect a user's fingertips while grating and/or a shredding such food.

In some implementations, the clustered opening 190 is configured such that the hand-held multi-purpose kitchen tool 100 can be used to protect a user's fingertips while otherwise preparing such food.

Furthermore, in some implementations, the clustered opening 190 may be configured such that the hand-held multi-purpose kitchen tool 100 can be used to provide other suitable food preparation functions, such as described below.

In some implementations, the clustered opening 190 is configured to provide a zester, grater, and/or shredder of the hand-held multi-purpose kitchen tool 100 by the dimensional configuration of the clustered opening 190. For example, as described above, in some implementations, the depth of the clustered opening 190 is less than the length, width, and/or diameter of the openings 191 of the clustered opening 190 (e.g., round/circular or generally round/circular shaped openings 191).

Thereby, in some implementations, the clustered opening 190 is configured dimensionally such that the hand-held multi-purpose kitchen tool 100 can be used to zest, grate, and/or shred food by a motioning of the clustered opening 190 along a portion of the food, as described more below.

In some implementations, the clustered opening 190 may be configured to provide a zester, grater, and/or shredder of the hand-held multi-purpose kitchen tool 100 by a feature of one or more of the openings 191 of the clustered opening 190. For example, in some implementations, one or more surfaces of the openings 191 (e.g., extending depthwise through the openings 191) may be sharp or otherwise configured such that the clustered opening 190 zests, grates, and/or shreds food by a motioning along a portion of the food. In some implementations, the clustered opening 190 may comprise any other suitable feature such that the clustered opening 190 is configured to provide a zester, grater, and/or shredder of the hand-held multi-purpose kitchen tool 100.

In some implementations, the hand-held multi-purpose kitchen tool 100 may comprise all of the above described components. In some implementations, the hand-held multi-purpose kitchen tool 100 may comprise one or more less than all of the above described components, e.g. in any suitable combination, permutation, etc.

For example, in some implementations, the hand-held multi-purpose kitchen tool 100 may comprise all of the above described components except for the clustered opening 190. Similarly, in some implementations, the hand-held multi-purpose kitchen tool 100 may comprise all of the above described components except for the elongated opening 180.

Thus, in some implementations, the hand-held multi-purpose kitchen tool 100 may suitably comprise any one or more of the above described components, such as in any suitable combination, permutation, etc., which will be understood by one skilled in the art in accordance with the present disclosure.

Figure 20:
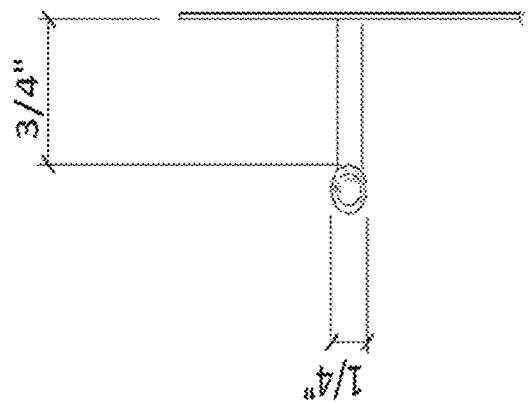
FIGS. 19 and 20 illustrate example dimensions of the hand-held multi-purpose kitchen tool according to the present disclosure.
Figure 19:
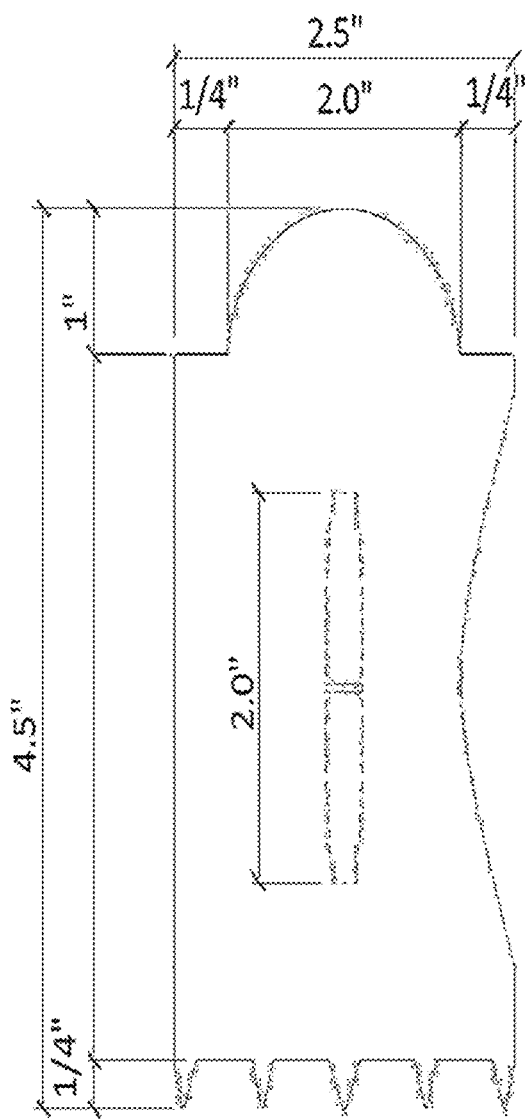

In some implementations, the hand-held multi-purpose kitchen tool 100 may have any suitable dimensions, such as the functional-related and component-respective dimensions described above. FIGS. 19 and 20 illustrate example dimensions of the hand-held multi-purpose kitchen tool 100 according to the present disclosure.

In some implementations, the hand-held multi-purpose kitchen tool 100 is configured to protect a user's fingertips while cutting food. For example, in some implementations, the hand-held multi-purpose kitchen tool 100 is configured to protect a user's fingertips while cutting food positioned on a surface, such as a cutting board or countertop. In some implementations, the hand-held multi-purpose kitchen tool 100 may be configured to protect a user's fingertips while cutting food held in the user's hand.

In some implementations, the hand-held multi-purpose kitchen tool 100 may be configured to protect a user's fingertips while using the hand-held multi-purpose kitchen tool 100 for any other suitable food preparation (or processing, etc.) function, such as described herein.

In some implementations, the hand-held multi-purpose kitchen tool 100 may be configured to additionally or alternately protect other portions of a user's hand. For example, in some implementations, the hand-held multi-purpose kitchen tool 100 may be configured to also protect a portion of the user's fingers that is adjacent to the user's fingertips. In some implementations, the hand-held multi-purpose kitchen tool 100 may be configured to also protect a user's fingers in general.

In some implementations, the hand-held multi-purpose kitchen tool 100 may be configured to also protect a user's fingernails. In some implementations, the hand-held multi-purpose kitchen tool 100 may be configured to also protect a user's knuckles.

In some implementations, the hand-held multi-purpose kitchen tool 100 is configured to protect a user's fingertips, and/or other portions of a user's hand, from pain or injury while using the hand-held multi-purpose kitchen tool 100 to prepare food. For example, in some implementations, the hand-held multi-purpose kitchen tool 100 is configured to protect a user's fingertips, and/or other portions of a user's hand, from being cut, scratched, or otherwise hurt or injured.

In some implementations, the hand-held multi-purpose kitchen tool 100 is configured to protect a user's fingertips, and/or other portions of a user's hand, from exposure while using the hand-held multi-purpose kitchen tool 100 to prepare food. For example, in some implementations, the hand-held multi-purpose kitchen tool 100 is configured to protect a user's fingertips, and/or other portions of a user's hand, from contacting the food.

In this way, in some implementations, the hand-held multi-purpose kitchen tool 100 protects a user's fingertips, and/or other portions of a user's hand, from absorbing the smell (or other transferable characteristic) of the food or feeling a stinging (or otherwise uncomfortable/undesirable) sensation caused by contact with the food. For example, in some implementations, the hand-held multi-purpose kitchen tool 100 protects from such smell or stinging that can be caused by contact with an onion, garlic, or peppers while cutting or otherwise preparing such food.

In such ways, in some implementations, the hand-held multi-purpose kitchen tool 100 serves as a shield, guard, and/or barrier for a user's fingertips, and/or other portions of a user's hand, while using the hand-held multi-purpose kitchen tool 100 to cut or otherwise prepare food.

In some implementations, the hand-held multi-purpose kitchen tool 100 is configured to protect a user's fingertips, and/or other portions of a user's hand, by the first surface 110 and/or the second surface 120. In some implementations, the hand-held multi-purpose kitchen tool 100 is configured to protect a user's fingertips, and/or other portions of a user's hand, by any other suitable component of the hand-held multi-purpose kitchen tool 100.

In some implementations, the hand-held multi-purpose kitchen tool 100 is configured to be held, e.g. by the handle 170, and used to prepare food, such as cutting the food.

In some implementations, the hand-held multi-purpose kitchen tool 100 is configured to be held, e.g. by the handle 170, and used to protect a user's fingertips, and/or other portions of a user's hand, while preparing food.

In some implementations, the hand-held multi-purpose kitchen tool 100 is configured to press, crush, or otherwise compress food, such as garlic. In some implementations, the hand-held multi-purpose kitchen tool 100 is configured to press, crush, or otherwise compress food positioned on a surface, such as a cutting board or countertop. In some implementations, the hand-held multi-purpose kitchen tool 100 is configured to press, crush, or otherwise compress food by the second surface 120 and/or the first surface 110 of the hand-held multi-purpose kitchen tool 100.

In some implementations, the hand-held multi-purpose kitchen tool 100 is configured to rake or scrape food. In some implementations, the hand-held multi-purpose kitchen tool 100 is configured to rake or scrape food by the first side 130.

In some implementations, the hand-held multi-purpose kitchen tool 100 is configured to rake or scrape food across a surface such as a cutting board or countertop. In some implementations, the hand-held multi-purpose kitchen tool 100 is configured to rake or scrape food along or off of a surface such as a knife blade.

In some implementations, the hand-held multi-purpose kitchen tool 100 is configured to hold down food, such as carrots or celery (e.g., round/cylindrical or generally round/cylindrical shaped foods). In some implementations, the hand-held multi-purpose kitchen tool 100 is configured to hold down other food that is similarly shaped and/or is suitably positioned, stacked, etc.

In some implementations, the hand-held multi-purpose kitchen tool 100 is configured to hold down food by the second side 140.

In some implementations, the hand-held multi-purpose kitchen tool 100 is configured to hold down food positioned on a surface, such as a cutting board or countertop. In some implementations, the hand-held multi-purpose kitchen tool 100 is configured to hold down food for cuffing or other preparation.

In some implementations, the hand-held multi-purpose kitchen tool 100 is configured to pin down or otherwise hold in place food, such as meat. In some implementations, the hand-held multi-purpose kitchen tool 100 is configured to pin down or otherwise hold in place food by the first end 150.

In some implementations, the hand-held multi-purpose kitchen tool 100 is configured to pin down or otherwise hold in place food upon a surface, such as a cutting board or countertop. In some implementations, the hand-held multi-purpose kitchen tool 100 is configured to pin down or otherwise hold in place food for cutting or other preparation.

In some implementations, the hand-held multi-purpose kitchen tool 100 is configured to pull apart and/or shred off (or shred loose) food, such as meat. In some implementations, the hand-held multi-purpose kitchen tool 100 is configured to pull apart and/or shred off food, such as from a slab or bone.

In some implementations, the hand-held multi-purpose kitchen tool 100 is configured to pull apart and/or shred off food by the first end 150.

In some implementations, the hand-held multi-purpose kitchen tool 100 is configured to pull apart and/or shred off food positioned on a surface, such as a cutting board or countertop. In some implementations, the hand-held multi-purpose kitchen tool 100 is configured to pull apart and/or shred off food for cutting or other preparation.

In some implementations, the hand-held multi-purpose kitchen tool 100 is configured to cup or juice food, such as a lemon or a lime. In some implementations, the hand-held multi-purpose kitchen tool 100 is configured to cup or juice food to extract or otherwise obtain the juice, liquid, or similar content from the food.

In some implementations, the hand-held multi-purpose kitchen tool 100 is configured to cup or juice food by the second end 160.

In some implementations, the hand-held multi-purpose kitchen tool 100 is configured to cup or juice food positioned on a surface, such as a cutting board or countertop. In some implementations, the hand-held multi-purpose kitchen tool 100 is configured to cup or juice food held in a user's hand.

In some implementations, the hand-held multi-purpose kitchen tool 100 is configured to slice or cut food, such as cheese. In some implementations, the hand-held multi-purpose kitchen tool 100 is configured to slice food by the elongated opening 180.

In some implementations, the hand-held multi-purpose kitchen tool 100 is configured to slice food positioned on a surface, such as a cutting board or countertop. In some implementations, the hand-held multi-purpose kitchen tool 100 is configured to slice food held in a user's hand.

In some implementations, the hand-held multi-purpose kitchen tool 100 is configured to shave or peel food, such as fruit or vegetables. In some implementations, the hand-held multi-purpose kitchen tool 100 is configured to shave or peel food by the elongated opening 180.

In some implementations, the hand-held multi-purpose kitchen tool 100 is configured to shave or peel food positioned on a surface, such as a cutting board or countertop. In some implementations, the hand-held multi-purpose kitchen tool 100 is configured to shave or peel food held in a user's hand.

In some implementations, the hand-held multi-purpose kitchen tool 100 is configured to zest food, such as a lemon or lime. In some implementations, the hand-held multi-purpose kitchen tool 100 is configured to zest food by the clustered opening 190.

In some implementations, the hand-held multi-purpose kitchen tool 100 is configured to zest food positioned on a surface, such as a cutting board or countertop. In some implementations, the hand-held multi-purpose kitchen tool 100 is configured to zest food held in a user's hand.

In some implementations, the hand-held multi-purpose kitchen tool 100 is configured to grate and/or shred food, such as cheese. In some implementations, the hand-held multi-purpose kitchen tool 100 is configured to grate and/or shred food by the clustered opening 190.

In some implementations, the hand-held multi-purpose kitchen tool 100 is configured to grate and/or shred food positioned on a surface, such as a cutting board or countertop. In some implementations, the hand-held multi-purpose kitchen tool 100 is configured to grate and/or shred food held in a user's hand.

In some implementations, the hand-held multi-purpose kitchen tool 100 may be configured to use while cutting food, as described herein, in any suitable way. For example, in some implementations, the hand-held multi-purpose kitchen tool 100 may be configured to use while slicing, dicing, or mincing food.

In some implementations, as described herein, the hand-held multi-purpose kitchen tool 100 may be configured to hold, grip, and/or contain food while cutting the food in such ways.

In some implementations, the hand-held multi-purpose kitchen tool 100 may be configured to provide any other suitable food preparation function.

In some implementations, the hand-held multi-purpose kitchen tool 100 is configured to use, such as described herein, to prepare any suitable foods. For example, in some implementations, the hand-held multi-purpose kitchen tool 100 is configured to use while cutting or otherwise preparing vegetables, fruits, herbs, meats, etc.

In some implementations, the hand-held multi-purpose kitchen tool 100 comprises any suitable dimensions, such as the example dimensions shown in FIGS. 19 and 20.

In some implementations, the hand-held multi-purpose kitchen tool 100 is composed of any suitable materials. For example, in some implementations, the hand-held multi-purpose kitchen tool 100 is composed of stainless steel.

In some implementations, the hand-held multi-purpose kitchen tool 100 can have any suitable appearance.

FIGS. 5-18 illustrate example uses of the hand-held multi-purpose kitchen tool 100 according to the present disclosure.

In some implementations, an example method of using the hand-held multi-purpose kitchen tool 100, with respect to the FIGS. described herein, comprises holding the hand-held multi-purpose kitchen tool 100 by the handle 170.

In some implementations, the handle 170 is held to use the hand-held multi-purpose kitchen tool 100 for preparation of food. In some implementations, the handle 170 is held to use the hand-held multi-purpose kitchen tool 100 for protecting a user's hand, such as the user's fingertips and/or other portions of the user's hand, while preparing food. For example, FIGS. 5-18 illustrate examples of such food preparation use and/or such hand protection use of the hand-held multi-purpose kitchen tool 100, as described more below.

As shown in FIGS. 5-7 and 11-16, in some implementations, the handle 170 may be held between two or more of a user's fingers to hold the hand-held multi-purpose kitchen tool 100. For example, in some implementations, the handle 170 is held between a user's index finger (or forefinger) and middle finger.

In some implementations, the handle 170 is held between those fingers with each finger bent at least partly bent at the middle knuckle (i.e., the knuckle between the proximal knuckle, closest to the hand, and the distal knuckle, farthest form the hand). In some implementations, the distal and/or proximal knuckle of each finger may also be at least partly bent. In some implementations, the handle 170 is held between those fingers such that the outer side (i.e. opposite from the palm side) of the fingers is adjacent to and/or faces toward the first surface 110 of the hand-held multi-purpose kitchen tool 100.

In some implementations, the handle 170 is held between the intermediate (e.g., intermediate phalangeal) portion of those fingers (i.e., the portion of the fingers at, adjacent to, or between the middle knuckle and the distal knuckle). In some implementations, the handle 170 is held between the adjacent side surfaces of those fingers (i.e., the surfaces that normally face together and/or contact each other when the fingers are aligned together side by side).

In some implementations, the handle 170 is held between those fingers at the first component 171 and/or the second component 172 of the handle 170. For example, in some implementations, the handle 170 is so held such that the fingers contact one or more of the surfaces 171c, 171d, 171e, 171f of the first component 171 and/or of the surfaces 172a, 172c, 172d, 172e, 172f of the second component 172 of the handle 170 described above for FIGS. 2 and 3.

In some implementations, the handle 170 is so held such that one or more of the surfaces 172a, 172c, 172d, 172e, 172f of the second component 172 of the handle 170 provides contact and/or support with the fingers to allow the handle 170 to be securely held by the user (i.e., without slipping loose and/or being dropped).

As shown in FIGS. 8-10 and 17-18, the handle 170 may be held between a user's finger and thumb to hold the hand-held multi-purpose kitchen tool 100. For example, in some implementations, the handle 170 is held between a user's index finger (or forefinger) and thumb.

In some implementations, the handle 170 is held between the finger and thumb with the finger at least partly bent at the middle knuckle (i.e., the portion of the finger between the middle knuckle and the distal knuckle). In some implementations, the distal and/or proximal knuckle of the finger may also be at least partly bent.

In some implementations, the handle 170 is held between the finger and thumb such that the inner side (i.e. the palm side) of the finger is adjacent to and/or faces toward the handle 170 and/or the first surface 110. In some implementations, the handle 170 is held between the finger and thumb such that the inner side of the thumb is adjacent to and/or faces toward the handle 170.

In some implementations, the handle 170 is held between the intermediate (e.g., intermediate phalangeal) portion of the finger (i.e., the portion of the finger at, adjacent to, or between the middle knuckle and the distal knuckle) and the distal portion of the thumb (i.e., the portion of the thumb at, adjacent to, or between the thumbtip and/or the distal knuckle).

In some implementations, the handle 170 is held between the adjacent inner and/or side surfaces of the finger and of the thumb (i.e., the surfaces that face together and/or contact each other when the fingertip and thumbtip are moved together).

In some implementations, the handle 170 is held between the finger and thumb at the second component 172 and/or the first component 171 of the handle 170. For example, in some implementations, the handle 170 is so held such that the finger and/or the thumb contacts one or more of the surfaces 172a, 172b, 172c, 172d, 172e, 172f of the second component 172 and/or of the surfaces 171c, 171d, 171e, 171f of the first component 171 of the handle 170 described above for FIGS. 2 and 3.

In some implementations, the handle 170 is so held such that one or more of the surfaces 172a, 172b, 172c, 172d, 172e, 172f of the second component 172 of the handle 170 provides contact and/or support with the finger and/or the thumb to allow the handle 170 to be securely held by the user (i.e., without slipping loose and/or being dropped).

In some implementations, the handle 170 may be held between any other suitable finger(s) and/or the thumb of a user's hand. In some implementations, the handle 170 may be held in any other suitable way.

In some implementations, the hand-held multi-purpose kitchen tool 100 may be held in any other suitable way.

In some implementations, a method of the using the hand-held multi-purpose kitchen tool 100 comprises using the hand-held multi-purpose kitchen tool 100 to protect a user's hand, such as the user's fingertips and/or other portions of the user's hand, while preparing food. For example, in some implementations, the method includes holding the hand-held multi-purpose kitchen tool 100, such as by the example method described above with respect to FIGS. 5-18.

As shown in FIGS. 5-18, in some implementations, the hand-held multi-purpose kitchen tool 100 is used to protect one or more portions of a user's hand that is holding and/or positioned adjacent to the hand-held multi-purpose kitchen tool 100, such as adjacent to the first surface 110. For example, as shown in FIGS. 5-7 and 11-15, in some implementations, the hand-held multi-purpose kitchen tool 100 may be used to protect one or more of the user's fingertips, fingernails, knuckles, and/or fingers of a user's hand that is holding and/or positioned adjacent to the hand-held multi-purpose kitchen tool 100.

As shown in FIGS. 5-18, in some implementations, the hand-held multi-purpose kitchen tool 100 is used to protect one or more portions of a user's hand while preparing food, such as described more below. For example, as shown in FIGS. 6-7 and 11-15, in some implementations, the hand-held multi-purpose kitchen tool 100 may be used to protect one or more portions of a user's hand while cutting food, such as with a knife (e.g., a large and/or sharp knife). As shown in FIGS. 5, 8-10, and 16-18, in some implementations, the hand-held multi-purpose kitchen tool 100 may be used to protect one or more portions of a user's hand while using the hand-held multi-purpose kitchen tool 100 to prepare food, such as to crush, zest, juice, rake, slice, or grate food.

As described more above regarding the configuration of the hand-held multi-purpose kitchen tool 100 to protect a user's hand, in some implementations, the hand-held multi-purpose kitchen tool 100 is used to protect one or more portions of a user's hand from pain or injury, such as from being cut, scratched, or otherwise hurt or injured, while preparing food. As also described more above regarding the configuration of the hand-held multi-purpose kitchen tool 100 to protect a user's hand, in some implementations, the hand-held multi-purpose kitchen tool 100 is used to protect one or more portions of a user's hand from exposure and/or contact such as absorbing the smell (or other transferable characteristic) of a food or feeling a stinging (or otherwise uncomfortable/undesirable) sensation caused by contact with the food while preparing the food.

Figure 5:

As shown in FIG. 5, in some implementations, a method of the using the hand-held multi-purpose kitchen tool 100 comprises using the hand-held multi-purpose kitchen tool 100 to press, crush, or otherwise compress food. For example, in some implementations, the hand-held multi-purpose kitchen tool 100 may be held by the handle 170 between the user's index finger and middle finger, such as by the method of holding the hand-held multi-purpose kitchen tool 100 described above.

In some implementations, the hand-held multi-purpose kitchen tool 100 may be pressed or pushed upon by the user's fingers and/or other portions of the user's hand against the first surface 110 and/or the handle 170. In some implementations, the hand-held multi-purpose kitchen tool 100 may thereby contact the food by the second surface 120 to thereby press, crush, or otherwise compress food.

In some implementations, the food may be pressed, crushed, or otherwise compressed by the hand-held multi-purpose kitchen tool 100 upon a surface, such as a cutting board or countertop.

In some implementations, the food that the hand-held multi-purpose kitchen tool 100 is used to press, crush, or otherwise compress may be garlic. In some implementations, the food that the hand-held multi-purpose kitchen tool 100 is used to press, crush, or otherwise compress may be any other suitable food.

In some implementations, the method also comprises using the hand-held multi-purpose kitchen tool 100 to protect one or more portions of the user's hand, as described above, while pressing, crushing, or otherwise preparing the food. For example, in some implementations, the hand-held multi-purpose kitchen tool 100 may be used to protect the user's fingers, thumb, etc. that are adjacent to the hand-held multi-purpose kitchen tool 100. In some implementations, the hand-held multi-purpose kitchen tool 100 may protect such portions of the user's hand by the first surface 110.

In some implementations, the hand-held multi-purpose kitchen tool 100 may thereby protect such portions of the user's hand from pain, injury, exposure, and/or contact, as described above. For example, in some implementations, the hand-held multi-purpose kitchen tool 100 may prevent undesirable and/or uncomfortable exposure to and/or contact with the food, such as pungent garlic.

As shown in FIGS. 13-16, in some implementations, a method of the using the hand-held multi-purpose kitchen tool 100 comprises using the hand-held multi-purpose kitchen tool 100 to rake or scrape (or otherwise move) food, such as along or across a surface. For example, in some implementations, the hand-held multi-purpose kitchen tool 100 may be held by the handle 170 between the user's index finger and middle finger, such as by the method of holding the hand-held multi-purpose kitchen tool 100 described above.

In some implementations, the hand-held multi-purpose kitchen tool 100 may be pressed or pushed upon by the user's fingers and/or other portions of the user's hand against the first surface 110 and/or the handle 170. In some implementations, the hand-held multi-purpose kitchen tool 100 may thereby contact the food by the straight-edged first side 130 of the hand-held multi-purpose kitchen tool 100 to rake or scrape the food. In some implementations, the hand-held multi-purpose kitchen tool 100 may also thereby contact the food by the second surface 120 of the hand-held multi-purpose kitchen tool 100 to rake or scrape the food.

Figure 14:
Figure 13:
Figure 16:
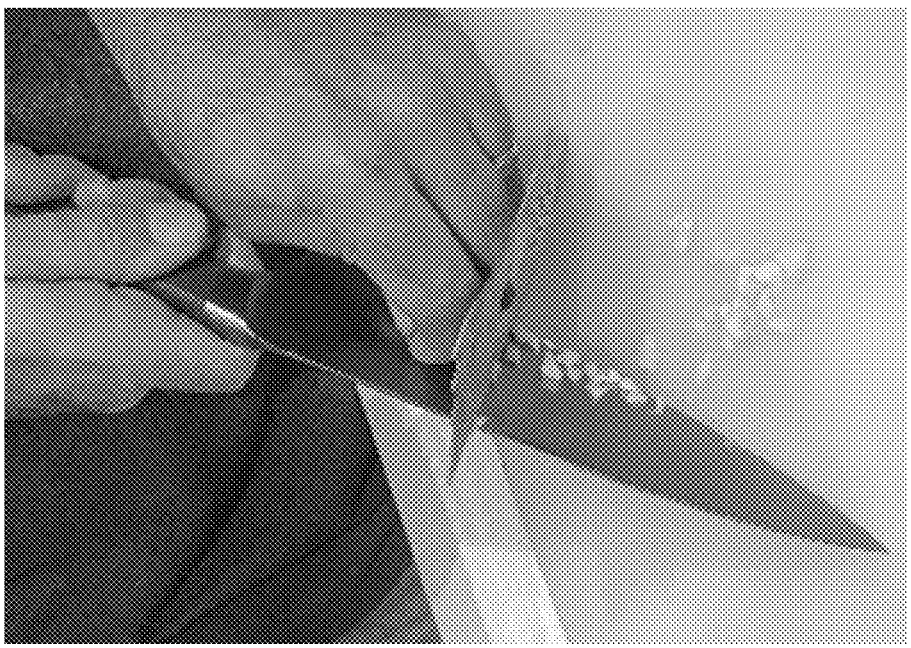
Figure 15:

As shown in FIGS. 13-15, in some implementations, the food may be raked or scraped by the hand-held multi-purpose kitchen tool 100 along or across a surface, such as a cutting board or countertop. As shown in FIG. 16, in some implementations, the food may be raked or scraped by the hand-held multi-purpose kitchen tool 100 onto or off of a surface, such as a knife blade.

For example, as shown in FIG. 15, in some implementations, a food (such as garlic) may be minced or otherwise prepared on a cutting board or other surface. In some implementations, the hand-held multi-purpose kitchen tool 100 may thereafter be used to rake or scrape the prepared food from the cutting board onto a knife blade. As shown in FIG. 16, in some implementations, the hand-held multi-purpose kitchen tool 100 may then be used to rake or scrape the prepared food off of the knife blade, such as onto another surface, into a cooking pan, etc. (e.g., for further preparation and/or cooking of the food).

As shown in FIGS. 13-16, in some implementations, the food that the hand-held multi-purpose kitchen tool 100 is used to rake or scrape may be onions, parsley, or garlic. In some implementations, the food that the hand-held multi-purpose kitchen tool 100 is used to rake or scrape may be any other suitable food.

In some implementations, the method also comprises using the hand-held multi-purpose kitchen tool 100 to protect one or more portions of the user's hand, as described above, while raking, scraping, or otherwise preparing the food (e.g., cutting the food as described below). For example, in some implementations, the hand-held multi-purpose kitchen tool 100 may be used to protect the user's fingers, thumb, etc. that are adjacent to the hand-held multi-purpose kitchen tool 100. In some implementations, the hand-held multi-purpose kitchen tool 100 may protect such portions of the user's hand by the first surface 110.

In some implementations, the hand-held multi-purpose kitchen tool 100 may thereby protect such portions of the user's hand from pain, injury, exposure, and/or contact, as described above. For example, in some implementations, the hand-held multi-purpose kitchen tool 100 may prevent undesirable and/or uncomfortable exposure to and/or contact with the food, such as pungent onions or garlic.

Furthermore, as shown in FIGS. 13-15, in some implementations, a method of using the hand-held multi-purpose kitchen tool 100, with respect to the above described method of using the straight-edged first side 130, comprises positioning/resting the first side 130 upon a surface, such as a cutting board or countertop, adjacent to food. In some implementations, the first side 130 is so positioned/rested such that the hand-held multi-purpose kitchen tool 100, e.g. by the first surface 110 and/or the second surface 120, serves as a shield to protect the user's finger(s) and/or other portions of the user's hand while the user cuts the food with a knife or other suitable utensil.

Figure 12:
Figure 11:

As shown in FIGS. 11 and 12, in some implementations, a method of the using the hand-held multi-purpose kitchen tool 100 comprises using the hand-held multi-purpose kitchen tool 100 to hold down food, such as positioned on a surface. For example, in some implementations, the hand-held multi-purpose kitchen tool 100 may be held by the handle 170 between the user's index finger and middle finger, such as by the method of holding the hand-held multi-purpose kitchen tool 100 described above.

In some implementations, the hand-held multi-purpose kitchen tool 100 may be pressed or pushed upon by the user's fingers and/or other portions of the user's hand against the handle 170 and/or the first surface 110. In some implementations, the hand-held multi-purpose kitchen tool 100 may thereby contact the food by the curved-edged second side 140 of the hand-held multi-purpose kitchen tool 100 to hold down the food.

In some implementations, the cutout 141 portion of the second side 140 makes contact with and holds down the food while using the second side 140 of the hand-held multi-purpose kitchen tool 100 to hold down the food. In some implementations, the first extension 142 and/or the second extension 143 may make contact with the food and/or with the surface upon which the food is positioned while using the second side 140 of the hand-held multi-purpose kitchen tool 100 to hold down the food.

As shown in FIGS. 11 and 12, in some implementations, the food may be held down by the hand-held multi-purpose kitchen tool 100 upon a surface, such as a cutting board or countertop. For example, in some implementations, a food may be held down by the hand-held multi-purpose kitchen tool 100 and cut with a knife or otherwise suitably prepared.

In some implementations, the food that the hand-held multi-purpose kitchen tool 100 is used to hold down may be carrots or celery. For example, in some implementations, the food that the hand-held multi-purpose kitchen tool 100 is used to hold down may be a round/cylindrical or generally round/cylindrical shaped food. In some implementations, the food may be elongated. In some implementations, the food may be stacked, piled, or otherwise arranged such that it can be held down under the curved-edge second side 140.

In some implementations, the food that the hand-held multi-purpose kitchen tool 100 is used to hold down may be any other suitable food. In some implementations, the food may have any other suitable features such that it can be held down by the second side 140 of the hand-held multi-purpose kitchen tool 100.

In some implementations, the method also comprises using the hand-held multi-purpose kitchen tool 100 to protect one or more portions of the user's hand, as described above, while holding down and cutting or otherwise preparing the food. For example, in some implementations, the hand-held multi-purpose kitchen tool 100 may be used to protect the user's fingers, thumb, etc. that are adjacent to the hand-held multi-purpose kitchen tool 100. In some implementations, the hand-held multi-purpose kitchen tool 100 may protect such portions of the user's hand by the first surface 110.

In some implementations, the hand-held multi-purpose kitchen tool 100 may thereby protect such portions of the user's hand from pain, injury, exposure, and/or contact, as described above. For example, in some implementations, the hand-held multi-purpose kitchen tool 100 may prevent undesirable and/or uncomfortable exposure to and/or contact with the food, such as pungent food.

Figure 6:
FIGS. 5-18 illustrate example uses of the hand-held multi-purpose kitchen tool according to the present disclosure.
Figure 7:

As shown in FIGS. 6 and 7, in some implementations, a method of the using the hand-held multi-purpose kitchen tool 100 comprises using the hand-held multi-purpose kitchen tool 100 to pin down or otherwise hold in place food, such as positioned on a surface. For example, in some implementations, the hand-held multi-purpose kitchen tool 100 may be held by the handle 170 between the user's index finger and middle finger, such as by the method of holding the hand-held multi-purpose kitchen tool 100 described above.

In some implementations, the hand-held multi-purpose kitchen tool 100 may be pressed or pushed upon by the user's fingers and/or other portions of the user's hand against the handle 170 and/or the first surface 110. In some implementations, the hand-held multi-purpose kitchen tool 100 may thereby contact the food by the fork-end shaped first end 150 of the hand-held multi-purpose kitchen tool 100 to pin down the food. For example, in some implementations, the apexes 151*d* of the peaks 151 of the first end 150 may grab, pierce, pin down, or otherwise secure the food when the food is contacted by the first end 150.

As shown in FIGS. 6 and 7, in some implementations, the food may be pinned down by the hand-held multi-purpose kitchen tool 100 upon a surface, such as a cutting board or countertop. For example, in some implementations, a food may be pinned down by the hand-held multi-purpose kitchen tool 100 and cut with a knife or otherwise suitably prepared.

In some implementations, the food that the hand-held multi-purpose kitchen tool 100 is used to pin down may be any suitable food that can be pinned down by the fork-end shaped first end 150 of the hand-held multi-purpose kitchen tool 100. For example, as shown in FIG. 6, in some implementations, the food that the hand-held multi-purpose kitchen tool 100 is used to pin down may be meat. As shown in FIG. 7, in some implementations, the food may be a vegetable or fruit.

In some implementations, the method also comprises using the hand-held multi-purpose kitchen tool 100 to protect one or more portions of the user's hand, as described above, while pinning down and cutting or otherwise preparing the food. For example, in some implementations, the hand-held multi-purpose kitchen tool 100 may be used to protect the user's fingers, thumb, etc. that are adjacent to the hand-held multi-purpose kitchen tool 100. In some implementations, the hand-held multi-purpose kitchen tool 100 may protect such portions of the user's hand by the first surface 110.

In some implementations, the hand-held multi-purpose kitchen tool 100 may thereby protect such portions of the user's hand from pain, injury, exposure, and/or contact, as described above. For example, in some implementations, the hand-held multi-purpose kitchen tool 100 may prevent undesirable and/or uncomfortable exposure to and/or contact with the food, such as pungent meats or onions.

Furthermore, as shown in FIG. 6, in some implementations, a method of using the hand-held multi-purpose kitchen tool 100, with respect to the above described method of using the fork-end shaped first end 150, comprises pulling apart and/or shredding off food, such as meat or any other suitable food. In some implementations, the food is pulled apart and/or shredded off by the first end 150 of the hand-held multi-purpose kitchen tool 100, such as by the apexes 151*d* of the peaks 151 of the first end 150 grabbing, piercing, or otherwise securing the food.

In some implementations, the food, such as meat, is pulled apart and/or shredded off from a slab or bone. In some implementations, the food is pulled apart and/or shredded off from any other configuration of the food.

In some implementations, the food is pulled apart and/or shredded off using the hand-held multi-purpose kitchen tool 100 to allow cutting or other preparation of the food using the hand-held multi-purpose kitchen tool 100, such as described herein.

In some implementations, the hand-held multi-purpose kitchen tool 100 may also be moved, such as pushed, pulled, rotated, etc., to use the hand-held multi-purpose kitchen tool 100 to pull apart and/or shred off food.

Figure 10:
Figure 9:

As shown in FIGS. 9 and 10, in some implementations, a method of the using the hand-held multi-purpose kitchen tool 100 comprises using the hand-held multi-purpose kitchen tool 100 to cup or juice food, such as a lemon or a lime, to extract or otherwise obtain the juice, liquid, or similar content from the food. For example, in some implementations, the hand-held multi-purpose kitchen tool 100 may be held by the handle 170 between the user's index finger and thumb, such as by the method of holding the hand-held multi-purpose kitchen tool 100 described above.

In some implementations, the hand-held multi-purpose kitchen tool 100 may be pushed and/or pulled by the user's finger and thumb and/or other portions of the user's hand upon the handle 170 and/or the first surface 110. In some implementations, the hand-held multi-purpose kitchen tool 100 may thereby contact the food by the cup-end or juicing-end provided by the second end 160 of the hand-held multi-purpose kitchen tool 100 to cup or juice the food.

For example, as shown in FIGS. 9 and 10, in some implementations, the protrusion 161 of the second end 160 may be pressed or pushed upon the juice containing portion of the food, such as the inner portion of a cut open/in-half piece of citrus fruit. In some implementations, the first extension 162 and/or the second extension 163 of the second end 160 may make contact with the food, such as with the edge and/or the juice containing portion of the food while using the hand-held multi-purpose kitchen tool 100 to cup or juice the food.

As shown in FIGS. 9 and 10, in some implementations, the food may be cupped or juiced using the hand-held multi-purpose kitchen tool 100 while the food is held by a user's hand, such as held above a bowl or other container to catch the juice that is extracted from the food. In some implementations, the food may be cupped or juiced using the hand-held multi-purpose kitchen tool 100 while the food is held by a user's hand and/or positioned upon a surface, such as a surface that is configured to catch the juice that is extracted from the food.

In some implementations, the food that the hand-held multi-purpose kitchen tool 100 is used to cup or juice may be any suitable food that can be cupped or juiced by the cup/juicing-end provided by the second end 160 of the hand-held multi-purpose kitchen tool 100. For example, as shown in FIGS. 9 and 10, in some implementations, the food that the hand-held multi-purpose kitchen tool 100 is used to cup or juice may be a lime, or similarly, a lemon. In some implementations, the food may be any other suitable fruit, such as citrus fruit, or other suitable vegetable, etc.

In some implementations, the method may also comprise using the hand-held multi-purpose kitchen tool 100 to protect one or more portions of the user's hand, as described above, while cupping/juicing or otherwise preparing the food. For example, in some implementations, the hand-held multi-purpose kitchen tool 100 may be used to protect the user's fingers, thumb, etc. that are adjacent to the hand-held multi-purpose kitchen tool 100. In some implementations, the hand-held multi-purpose kitchen tool 100 may protect such portions of the user's hand by the first surface 110.

In some implementations, the hand-held multi-purpose kitchen tool 100 may thereby protect such portions of the user's hand from pain, injury, exposure, and/or contact, as described above. For example, in some implementations, the hand-held multi-purpose kitchen tool 100 may prevent undesirable and/or uncomfortable exposure to and/or contact with the food, such as acidic fruits or pungent vegetables.

Figure 17:

As shown in FIG. 17, in some implementations, a method of the using the hand-held multi-purpose kitchen tool 100 comprises using the hand-held multi-purpose kitchen tool 100 to slice or cut food, such as cheese. For example, in some implementations, the hand-held multi-purpose kitchen tool 100 may be held by the handle 170 between the user's index finger and thumb, such as by the method of holding the hand-held multi-purpose kitchen tool 100 described above.

In some implementations, the hand-held multi-purpose kitchen tool 100 may be pushed and/or pulled by the user's finger and thumb and/or other portions of the user's hand upon the handle 170 and/or the first surface 110. In some implementations, the hand-held multi-purpose kitchen tool 100 may thereby contact the food by the slicer provided by the elongated opening 180 of the hand-held multi-purpose kitchen tool 100 to slice or cut the food.

For example, as shown in FIG. 17, in some implementations, the elongated opening 180 may be positioned and/or pressed upon a surface of the food by positioning and/or pressing the second surface 120 upon the food. In some implementations, the elongated opening 180 is then moved along the surface by moving the hand-held multi-purpose kitchen tool 100 such that the elongated opening 180 engages the food, such as a block of cheese, to slice off slices, pieces, portions, etc. of the food. In some implementations, the slices or other portions of the food that are sliced by moving the elongated opening 180 along the food adjacent to the second surface 120 are sliced through the elongated opening 180 such that the slices are produced adjacent to the first surface 110.

In some implementations, the food may be sliced using the hand-held multi-purpose kitchen tool 100 while the food is held by a user's hand, such as held above a surface (e.g., a cutting board or a plate). In some implementations, the food may be sliced using the hand-held multi-purpose kitchen tool 100 while the food is held by a user's hand and/or positioned upon a surface, such as a cutting board or countertop.

In some implementations, the food that the hand-held multi-purpose kitchen tool 100 is used to slice or cut may be any suitable food that can be sliced or cut by the slicer provided by the elongated opening 180 of the hand-held multi-purpose kitchen tool 100. For example, as shown in FIG. 17, in some implementations, the food that the hand-held multi-purpose kitchen tool 100 is used to slice may be cheese. In some implementations, the food may be in any suitable configuration, such as a block or wedge.

In some implementations, the method may also comprise using the hand-held multi-purpose kitchen tool 100 to protect one or more portions of the user's hand, as described above, while slicing or otherwise preparing the food. For example, in some implementations, the hand-held multi-purpose kitchen tool 100 may be used to protect the user's fingers, thumb, etc. that are adjacent to the hand-held multi-purpose kitchen tool 100. In some implementations, the hand-held multi-purpose kitchen tool 100 may protect such portions of the user's hand by the first surface 110.

In some implementations, the hand-held multi-purpose kitchen tool 100 may thereby protect such portions of the user's hand from pain, injury, exposure, and/or contact, as described above. For example, in some implementations, the hand-held multi-purpose kitchen tool 100 may prevent undesirable and/or uncomfortable exposure to and/or contact with the food, such as pungent cheese.

Furthermore, as shown in FIG. 17, in some implementations, a method of using the hand-held multi-purpose kitchen tool 100, with respect to the above described method of using the elongated opening 180 as a slicer, comprises using the elongated opening 180 to shave or peel food, such as fruit or vegetables. In some implementations, the hand-held multi-purpose kitchen tool 100 is used to shave or peel food by using the elongated opening 180 in the same or similar manner as described above for slicing food.

Figure 8:

As shown in FIG. 8, in some implementations, a method of the using the hand-held multi-purpose kitchen tool 100 comprises using the hand-held multi-purpose kitchen tool 100 to zest food, such as a lemon or lime. For example, in some implementations, the hand-held multi-purpose kitchen tool 100 may be held by the handle 170 between the user's index finger and thumb, such as by the method of holding the hand-held multi-purpose kitchen tool 100 described above.

In some implementations, the hand-held multi-purpose kitchen tool 100 may be pushed and/or pulled by the user's finger and thumb and/or other portions of the user's hand upon the handle 170 and/or the first surface 110. In some implementations, the hand-held multi-purpose kitchen tool 100 may thereby contact the food by the zester provided by the clustered opening 190 of the hand-held multi-purpose kitchen tool 100 to zest food (e.g., to grate a portion of the peel or skin off of citrus fruit such as lemons, limes, oranges, etc.).

For example, as shown in FIG. 8, in some implementations, the clustered opening 190 may be positioned and/or pressed upon a surface of the food by positioning and/or pressing the second surface 120 upon the food. In some implementations, the clustered opening 190 is then moved along the surface by moving the hand-held multi-purpose kitchen tool 100 such that the openings 191 of the clustered opening 190 engage the food, such as a lemon or lime, to zest the food.

In some implementations, the food is zested by grating (e.g., shaving or shredding small/fine pieces) off a portion (such as the outer portion) of the peel or skin of the food. In some implementations, the pieces or other portions of the food that are zested by moving the clustered opening 190 along the food adjacent to the second surface 120 are zested through the openings 191 of the clustered opening 190 such that the pieces are produced adjacent to the first surface 110.

In some implementations, the food may be zested using the hand-held multi-purpose kitchen tool 100 while the food is held by a user's hand, such as held above a surface (e.g., a cutting board or a plate). In some implementations, the food may be zested using the hand-held multi-purpose kitchen tool 100 while the food is held by a user's hand and/or positioned upon a surface, such as a cutting board or countertop.

In some implementations, the food that the hand-held multi-purpose kitchen tool 100 is used to zest may be any suitable food that can be zested by the zester provided by the clustered opening 190 of the hand-held multi-purpose kitchen tool 100. For example, as shown in FIG. 8, in some implementations, the food that the hand-held multi-purpose kitchen tool 100 is used to zest may be a lemon, or similarly, a lime or other citrus fruit. In some implementations, the food may be any other suitable fruit, vegetable, or other food.

In some implementations, the method may also comprise using the hand-held multi-purpose kitchen tool 100 to protect one or more portions of the user's hand, as described above, while zesting or otherwise preparing the food. For example, in some implementations, the hand-held multi-purpose kitchen tool 100 may be used to protect the user's fingers, thumb, etc. that are adjacent to the hand-held multi-purpose kitchen tool 100. In some implementations, the hand-held multi-purpose kitchen tool 100 may protect such portions of the user's hand by the first surface 110.

In some implementations, the hand-held multi-purpose kitchen tool 100 may thereby protect such portions of the user's hand from pain, injury, exposure, and/or contact, as described above. For example, in some implementations, the hand-held multi-purpose kitchen tool 100 may prevent undesirable and/or uncomfortable exposure to and/or contact with the food, such as acidic fruits or pungent vegetables.

Figure 18:

Furthermore, as shown in FIG. 18, in some implementations, a method of using the hand-held multi-purpose kitchen tool 100, with respect to the above described method of using the clustered opening 190 as a zester, comprises using the clustered opening 190 to grate or shred food, such as cheese. In some implementations, the hand-held multi-purpose kitchen tool 100 is used to grate or shred food by using the clustered opening 190 in the same or similar manner as described above for zesting food.

The figures, including photographs and drawings, comprised herewith may represent one or more implementations of the hand-held multi-purpose kitchen tool 100.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A method of using a hand-held multi-purpose kitchen tool apparatus by a user to prepare food a plurality of ways while guarding the user's hand, the apparatus comprising a body and a handle, wherein the body comprises a piece of material generally planar shaped having a first surface extending width-wise from a first side to a second side and length-wise from a first end to a second end; and a second surface, opposite the first surface and extending width-wise from the first side to the second side and length-wise from the first end to the second end, wherein the first side of the piece of material extending from the first end to the second end is straight; the second side of the piece of material, opposite the first side, and extending from the first end to the second end curves inward toward the first side along at least a portion of the second side thereby forming a u-shape; the first end of the piece of material extending from the first side to the second side comprises a plurality of protrusions spaced apart along the first end between the first side and the second side of the piece of material; the second end of the piece of material extending from the first side to the second side curves outward away from the piece of material thereby forming a protrusion at least partly along the second end extending between the first side and the second side of the piece of material; and the handle extends from a center portion of the first surface of the piece of material and is configured such that a user can hold the handle to use the apparatus wherein the piece of material further comprises a group of openings on a portion of the piece of material between the handle and the second end of the piece of material wherein the group of openings extend through and between the first surface and the second surface of the piece of material, the method comprising:

holding the apparatus by the handle using the user's hand such that at least a portion of the user's hand is positioned adjacent to the first surface of the piece of material about the center portion of the first surface of the piece of material and opposite the second surface of the piece of material and positioning the second surface of the piece of material adjacent a food item to prepare the food item thereby shielding by the generally planar shaped piece of material at least the portion of the user's hand positioned adjacent to the first surface of the piece of material from an object placed adjacent to the second surface of the piece of material to prepare the food item while the second surface of the piece of material is positioned adjacent the food item;

holding the apparatus by the handle using the users hand such that at least a portion of the user's hand is positioned adjacent to the first surface of the piece of material about the center portion of the first surface of the piece of material and opposite the second surface of the piece of material and positioning the curved portion of the second side of the piece of material on top of a food item to prepare the food item and shielding by the generally planar shaped piece of material at least the portion of the user's hand positioned adjacent to the first surface of the piece of material from an object laced adjacent to the second surface of the piece of material to prepare the food item while the curved portion of the second side of the piece of material is positioned on top of the food item; and holding the apparatus by the handle using the user's hand such that at least a portion of the user's hand is positioned adjacent to the first surface of the piece of material about the center portion of the first surface of the piece of material and opposite the second surface of the piece of material and positioning the first end of the piece of material on top of a food item to prepare the food item and shielding by the generally planar shaped piece of material at least the portion of the user's hand positioned adjacent to the first surface of the piece of material from an object placed adjacent to the second surface of the piece of material to prepare the food item while the first end of the piece of material is positioned on top of the food item.

2. A method of using a hand-held multi-purpose kitchen tool apparatus by a user to prepare food a plurality of ways while guarding the user's hand, the apparatus comprising: a body and a handle, wherein the body comprises a piece of material generally planar shaped having a first surface extending width-wise from a first side to a second side and length-wise from a first end to a second end; a second surface, opposite the first surface and extending width-wise from the first side to the second side and length-wise from the first end to the second end; an elongated opening on a portion of the piece of material between the handle and the first end of the piece of material extending through and between the first surface and the second surface of the piece of material, and a group of openings on a portion of the piece of material between the handle and the second end and extending through and between the first surface and the second surface of the piece of material, wherein the first side of the piece of material extending from the first end to the second end is straight; the second side of the piece of material, opposite the first side, and extending from the first end to the second end curves inward toward the first side along at least a portion of the second side thereby forming a u-shape; the first end of the piece of material extending from the first side to the second side comprises a plurality of protrusions spaced apart along the first end between the first side and the second side of the piece of material; the second end of the piece of material extending from the first side to the second side curves outward away from the piece of material thereby forming a protrusion at least partly along the second end extending between the first side and the second side of the piece of material; and the handle extends from a center portion of the first surface of the piece of material and is configured such that a user can hold the handle to use the apparatus, the method comprising:

holding the apparatus by the handle using the user's hand such that at least a portion of the user's hand is positioned adjacent to the first surface of the piece of material about the center portion of the first surface of the piece of material and opposite the second surface of the piece of material; and positioning the group of openings of the piece of material on a food item such that the second surface of the piece of material on a portion of the piece of material between the handle and the second end of the piece of material is positioned adjacent to the food item thereby shielding by the generally planar shaped piece of material at least the portion of the user's hand positioned adjacent to the first surface of the piece of material from an object placed adjacent to the group of opening on the second surface of the piece of material to prepare the food item; and moving the apparatus such that the group of openings moves along the food item and thereby zests or grates the food item through the group of openings from the second surface to the first surface of the piece of material;

holding the apparatus by the handle using the user's hand such that at least a portion of the user's hand is positioned adjacent to the first surface of the piece of material about the center portion of the first surface of the piece of material and opposite the second surface of the piece of material, positioning the first side of the piece of material on a surface such that the second surface of the piece of material is positioned adjacent to a food item positioned on the surface thereby shielding by the generally planar shaped piece of material at least the portion of the user's hand positioned adjacent to the first surface of the piece of material from an object placed adjacent to the second surface of the piece of material to prepare the food item while the second surface of the piece of material is positioned adjacent the food item, and cutting the food item with a knife;

holding the apparatus by the handle using the users hand such that at least a portion of the user's hand is positioned adjacent to the first surface of the piece of material about the center portion of the first surface of the piece of material and opposite the second surface of the piece of material, positioning the second surface of the piece of material on top of a food item positioned on a surface, thereby shielding by the generally planar shaped piece of material at least the portion of the user's hand positioned adjacent to the first surface of the piece of material from an object laced adjacent to the second surface of the piece of material to prepare the food item while the second surface of the piece of material is positioned on top of the food item, and moving the apparatus such that the second surface compresses the food item upon the surface;

holding the apparatus by the handle using the user's hand such that at least a portion of the user's hand is positioned adjacent to the first surface of the piece of material about the center portion of the first surface of the piece of material, positioning the apparatus such that the second side of the piece of material is positioned on a food item positioned on the surface such that the second side holds down the food item within the curved portion of the second side on the surface thereby shielding by the generally planar shaped piece of material at least the portion of the user's hand positioned adjacent to the first surface of the piece of material from an object placed adjacent to the second surface of the piece of material to prepare the food item while the curved portion of the second side of the piece of material is positioned on top of the food item, and cutting the food item with a knife;

holding the apparatus by the handle using the user's hand such that at least a portion of the user's hand is positioned adjacent to the first surface of the piece of material about the center portion of the first surface of the piece of material and positioning the apparatus such that the first end of the piece of material is positioned adjacent to a food item positioned on the surface such that the protrusions of the first end of the piece of material pin down the food item on the surface thereby shielding by the generally planar shaped piece of material at least the portion of the user's hand positioned adjacent to the first surface of the piece of material from an object placed adjacent to the second surface of the piece of material to prepare the food item while the first end of the piece of material is positioned on top of the food item and pinning down the food item on the surface using;

holding the apparatus by the handle using the user's hand such that at least a portion of the user's hand is positioned adjacent to the first surface of the piece of material about the center portion of the first surface of the piece of material, positioning the protrusion of the second end of the piece of material adjacent to a food item, and moving the apparatus such that the protrusion presses against the food item and thereby extracts a liquid content from the food item; and holding the apparatus by the handle using the user's hand such that at least a portion of the user's hand is positioned adjacent to the first surface of the piece of material about the center portion of the first surface of the piece of material and opposite the second surface of the piece of material, positioning the elongated opening of the piece of material on a food item such that the second surface of the piece of material is positioned adjacent to the food item thereby shielding by the generally planar shaked piece of material at least the portion of the user's hand positioned adjacent to the first surface of the piece of material from an object placed adjacent to the elongated opening on the second surface of the piece of material to prepare the food item, and moving the apparatus such that the elongated opening moves along the food item and thereby slices the food item through the elongated opening from the second surface to the first surface of the piece of material.

* * * * *

UNITED STATES PATENT AND TRADEMARK OFFICE
CERTIFICATE OF CORRECTION

PATENT NO. : 11,518,052 B2  
APPLICATION NO. : 16/868562  
DATED : December 6, 2022  
INVENTOR(S) : Michael Swilley Page 1 of 1

It is certified that error appears in the above-identified patent and that said Letters Patent is hereby corrected as shown below:

In the Specification

Column 1, Line 6, "person" should read --person's--;

In the Claims

Claim 1 at Column 37, Line 22, "laced" should read --placed--;

Claim 2 at Column 39, Line 36, after "on the surface using" insert --the apparatus--; and Claim 2 at Column 40, Line 17, "shaked" should read --shaped--.

Signed and Sealed this  
Second Day of September, 2025

Coke Morgan Stewart  
*Acting Director of the United States Patent and Trademark Office*